US012700933B2

(12) United States Patent
Duan et al.

(10) Patent No.: US 12,700,933 B2
(45) Date of Patent: Aug. 4, 2026

(54) ADAPTIVE MTI-BASED RF SENSING IN CELLULAR SYSTEMS

(71) Applicant: QUALCOMM Incorporated, San Diego, CA (US)

(72) Inventors: Weimin Duan, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 776 days.

(21) Appl. No.: 18/054,875

(22) Filed: Nov. 11, 2022

(65) Prior Publication Data

US 2024/0162995 A1 May 16, 2024

(51) Int. Cl.
*H04B 17/345* (2015.01)
*H04B 17/391* (2015.01)
*H04W 72/044* (2023.01)

(52) U.S. Cl.
CPC ....... *H04B 17/345* (2015.01); *H04B 17/3911* (2015.01); *H04W 72/0473* (2013.01)

(58) Field of Classification Search
CPC ............. H04B 17/345; H04B 17/3911; H04W 72/0473
See application file for complete search history.

(56) References Cited

U.S. PATENT DOCUMENTS

| | | | | |
|---|---|---|---|---|
| 5,884,224 A | * | 3/1999 | McNabb | .................. A01G 7/00 |
| | | | | 700/284 |
| 6,411,250 B1 | * | 6/2002 | Oswald | ............... G01S 13/0209 |
| | | | | 342/159 |
| 2012/0028566 A1 | * | 2/2012 | Vorbau | .................... G06F 16/68 |
| | | | | 455/3.01 |
| 2022/0253635 A1 | * | 8/2022 | Yu | .................... B60W 60/0027 |

FOREIGN PATENT DOCUMENTS

| | | |
|---|---|---|
| WO | 2022081624 A1 | 4/2022 |
| WO | 2022216351 A1 | 10/2022 |
| WO | 2023239437 A1 | 12/2023 |

OTHER PUBLICATIONS

International Search Report and Written Opinion—PCT/US2023/036043—ISA/EPO—Jan. 30, 2024 (2205620WO).

* cited by examiner

*Primary Examiner* — Brenda H Pham
(74) *Attorney, Agent, or Firm* — QUALCOMM Incorporated

(57) ABSTRACT

Aspects presented herein relate to methods and devices for wireless communication including an apparatus, e.g., a wireless device or a server. The apparatus may receive, from a network entity, an indication of clutter information from at least one sensing node or at least one sensor, where the clutter information is associated with one or more stationary or slow-moving reflections of one or more signals with respect to the at least one sensing node or the at least one sensor. The apparatus may also configure at least one filter in a set of filters at the wireless device based on the clutter information from the at least one sensing node or the at least one sensor.

27 Claims, 18 Drawing Sheets

$\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

Example Clutter PSD 710

$f_r$ = pulse repetition frequency
$k$ = constant

FIG. 7

$h(t) = \delta(t) - \delta(t - T)$ $H(z) = 1 - z^{-1}$ $h(t) = \delta(t) - 2\delta(t - T) - \delta(t - 2T)$ $H(z) = 1 - 2z^{-1} - z^{-2}$

1200

1206

Receive an indication of clutter information from at least one sensing node or at least one sensor

1208

Configure at least one filter in a set of filters based on the clutter information

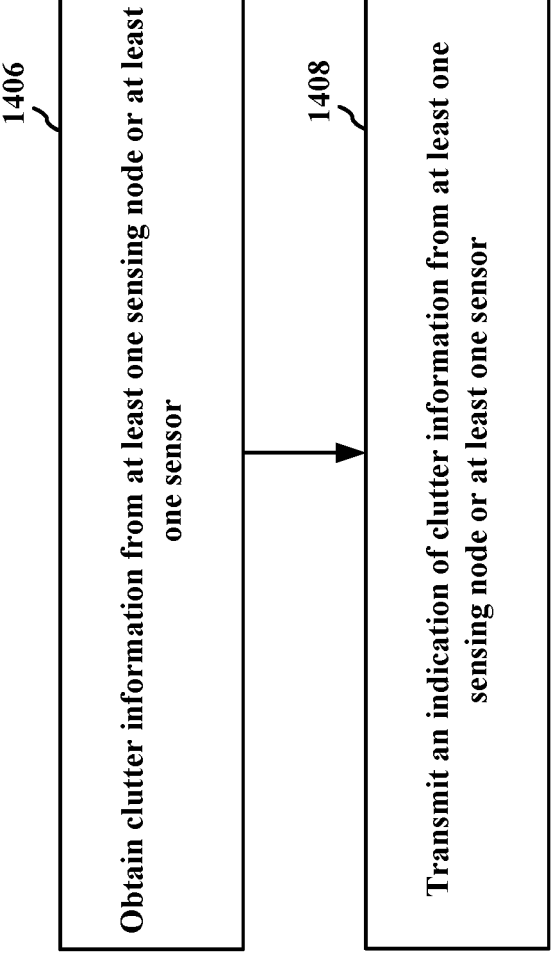
1406
Obtain clutter information from at least one sensing node or at least one sensor
1408
Transmit an indication of clutter information from at least one sensing node or at least one sensor
1400
FIG. 14

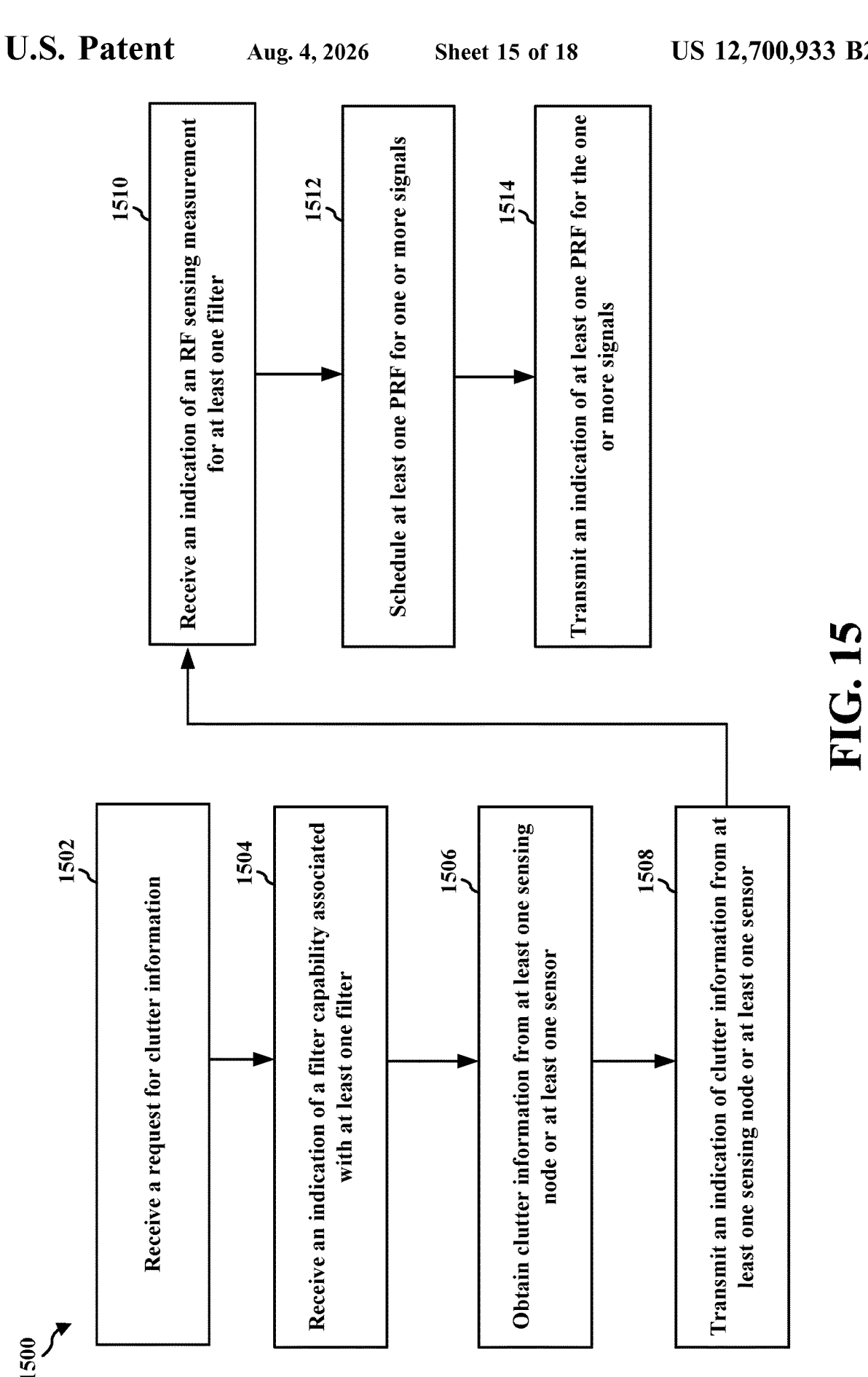

1502 — Receive a request for clutter information

1504 — Receive an indication of a filter capability associated with at least one filter 1506 — Obtain clutter information from at least one sensing node or at least one sensor 1508 — Transmit an indication of clutter information from at least one sensing node or at least one sensor 1510 — Receive an indication of an RF sensing measurement for at least one filter 1512 — Schedule at least one PRF for one or more signals 1514 — Transmit an indication of at least one PRF for the one or more signals

104

1740

Memory
1744

Transceiver(s)
1746

Antennas
1780

RU Processor
1742

Component 198

Memory 1742'

Communications
Interface
1748

1702

Midhaul
Link

Fronthaul
Link

1710

Memory
1714

Communications
Interface
1718

CU Processor
1712

Component 198

Memory 1712'

1730

Memory
1734

Communications
Interface
1738

DU Processor
1732

Component 199

Memory 1732'

1700

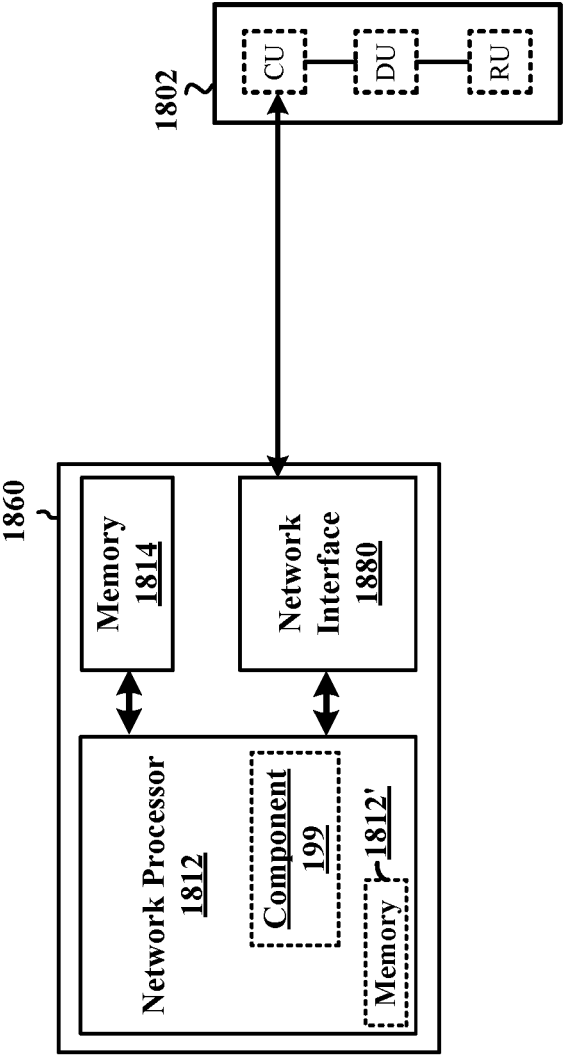
FIG. 18

ADAPTIVE MTI-BASED RF SENSING IN CELLULAR SYSTEMS

TECHNICAL FIELD

The present disclosure relates generally to communication systems, and more particularly, to positioning measurements in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an apparatus for wireless communication at a wireless device (e.g., a user equipment (UE) or a base station). The apparatus may transmit, for a network entity, a request for clutter information, where an indication of the clutter information is received based on the request. The apparatus may also transmit, for the network entity, an indication of a filter capability associated with at least one filter of the wireless device. The apparatus may also receive, from a network entity, an indication of clutter information from at least one sensing node or at least one sensor, where the clutter information is associated with one or more stationary or slow-moving reflections of one or more signals with respect to the at least one sensing node or the at least one sensor. Additionally, the apparatus may configure at least one filter in a set of filters at the wireless device based on the clutter information from the at least one sensing node or the at least one sensor. The apparatus may also perform a radio frequency (RF) sensing measurement for the at least one filter of the wireless device. The apparatus may also transmit, for the network entity, an indication of the RF sensing measurement for the at least one filter of the wireless device. Also, the apparatus may receive, from the network entity, an indication of at least one pulse repetition frequency (PRF) for the one or more signals.

In an aspect of the disclosure, a method, a computer-readable medium, and an apparatus are provided. The apparatus may be an apparatus for wireless communication at a network entity (e.g., a server or a sensing server). The apparatus may receive, from a wireless device, a request for clutter information, where an indication of the clutter information is transmitted based on the request. The apparatus may also receive, from the wireless device, an indication of a filter capability associated with at least one filter of the wireless device. The apparatus may also obtain clutter information from at least one sensing node or at least one sensor, where the clutter information is associated with one or more stationary or slow-moving reflections of one or more signals with respect to the at least one sensing node or the at least one sensor. Moreover, the apparatus may transmit, for a wireless device, an indication of the clutter information from the at least one sensing node or the at least one sensor, where the clutter information is associated with at least one filter of the wireless device. The apparatus may also receive, from the wireless device, an indication of a radio frequency (RF) sensing measurement for the at least one filter of the wireless device. The apparatus may also schedule at least one pulse repetition frequency (PRF) for the one or more signals. Further, the apparatus may transmit an indication of the at least one PRF for the one or more signals.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a graph illustrating an example power spectral density (PSD) of clutter.

FIG. 14 is a flowchart of a method of wireless communication.

FIG. 15 is a flowchart of a method of wireless communication.

FIG. 18 is a diagram illustrating an example of a hardware implementation for an example network entity.

DETAILED DESCRIPTION

Figure 1:
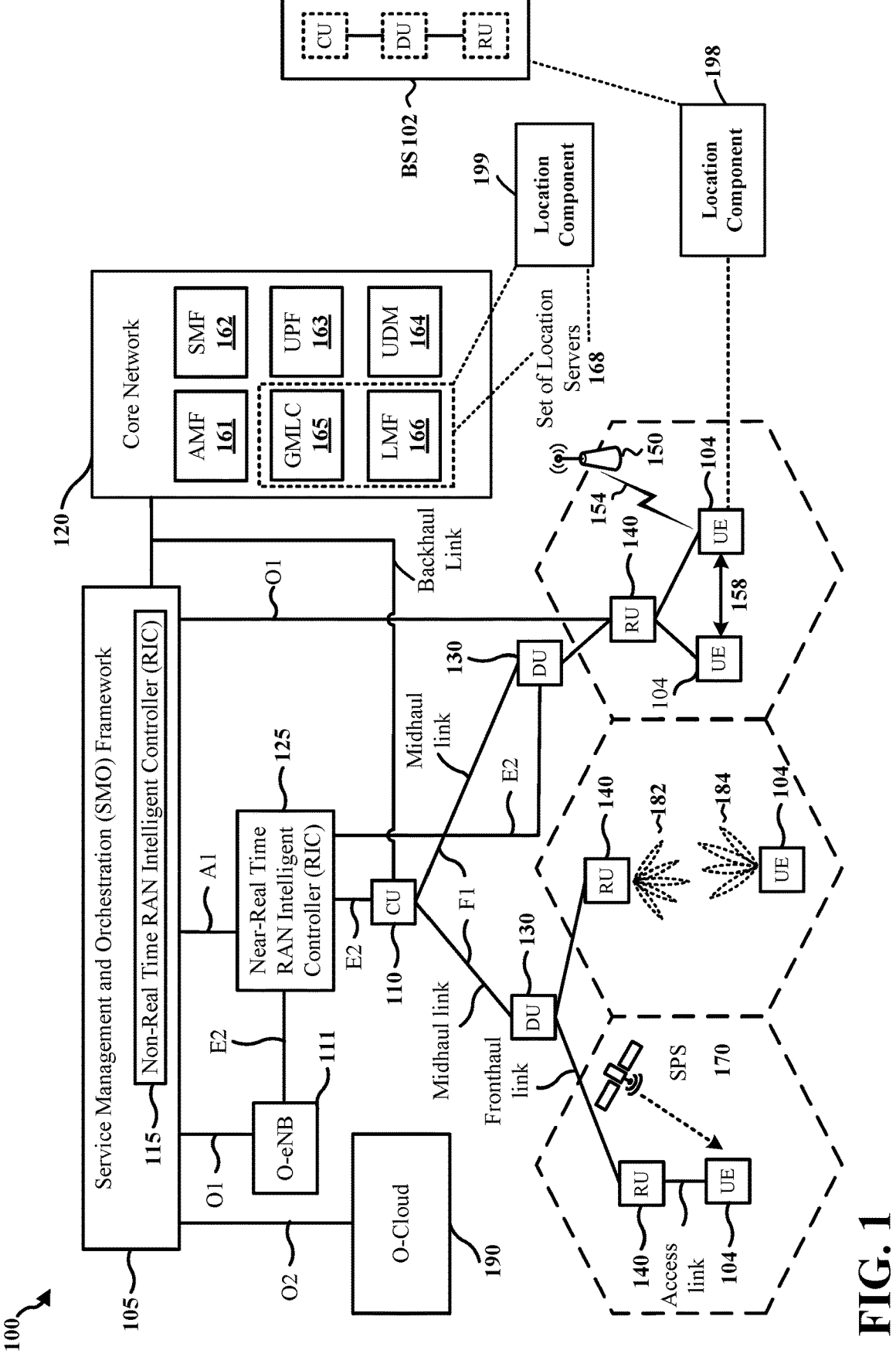
FIG. 1 is a diagram illustrating an example of a wireless communications system and an access network.

Some aspects of wireless communication may experience clutter (i.e., stationary reflections associated with signals or radar). For example, clutter may include unwanted stationary reflections with limited relative motion with respect to a certain target (e.g., signals or radar). The power spectral density (PSD) of clutter may be concentrated around certain types of signals or currents (e.g., direct current (DC)). Clutter may originate from the same range or angle cell as a target location. Some types of radar systems (e.g., pulsed radar systems) may utilize special types of filters that can distinguish between slow-moving or stationary targets and fast-moving targets. For example, one class of these types of filters is known as a moving target indicator (MTI) or MTI filter. The purpose of an MTI filter may be to suppress target-like returns produced by clutter. Further, MTI filters may allow returns from moving targets to pass through with little or no degradation. In some aspects, MTI filters may be implemented using delay line cancelers. A delay line canceler is a filter that eliminates the direct current (DC) components of echo signals received from stationary targets. That is, a delay line canceler may allow the alternating current (AC) components of echo signals received from non-stationary targets (i.e., moving targets). In some aspects, targets with Doppler frequencies equal to certain values may be severely attenuated. Target speeds that produce Doppler frequencies equal to $kf_r$ may be referred to as blind speeds: $v_{blind} = (k\lambda f_r)/2$. Blind speeds may pose serious limitations on the performance of MTI radars and their ability to perform adequate target detection. In order to resolve the issue of blind speed, the pulse repetition frequency (PRF) may be increased, so the radar may have a range ambiguity issue. In order to resolve the issue of blind speeds, multiple PRF schemes may be utilized (i.e., utilize PRF staggering). As indicated above, in order to resolve the issue of blind speeds, multiple PRF schemes may be utilized (i.e., with PRF staggering). PRF staggering is staggering or changing the pulse repetition interval between consecutive pulses. PRF staggering may mitigate the effect of blind speeds, such as by extending a first blind speed to a more tolerable value. In some aspects, the design of MTI filters may depend on a clutter power spectral density and target speed. The selection of MTI filters may also depend on the design of radar reference signals (RSs). For periodic radar RSs, the periodicity may decide the clutter notch frequency and the blind speed. The radar transmitter (Tx) may need to be aware of which type of MTI is supported by the radar receiver (Rx). Aspects of the present disclosure may enhance MTI-based radio frequency (RF) sensing in cellular systems. For example, aspects presented herein may utilize adaptive MTI-based RF sensing in cellular systems. In some instances, aspects presented herein may also utilize MTI filters that operate in bi-static or multi-static cases. Additionally, aspects presented herein may utilize Tx radars and Rx radars that are different network nodes in a cellular system. Also, aspects presented herein may utilize MTI filters that are associated with clutter information. Moreover, aspects presented herein may enhance RF sensing measurement reports. Further, aspects presented herein may utilize adaptive pulse repetition frequency (PRF) for MTI filters.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface).

Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other.

Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and a velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. In some scenarios, the term UE may also apply to one or more companion devices such as in a device constellation arrangement. One or more of these devices may collectively access the network and/or individually access the network. A network node can be implemented as a base station (i.e., an aggregated base station), as a disaggregated base station, an integrated access and backhaul (IAB) node, a relay node, a sidelink node, etc. A network entity can be implemented as a base station (i.e., an aggregated base station), or alternatively, as a central unit (CU), a distributed unit (DU), a radio unit (RU), a Near-Real Time (Near-RT) RAN Intelligent Controller (RIC), or a Non-Real Time (Non-RT) RIC in a disaggregated base station architecture.

Referring again to FIG. 1, in certain aspects, the UE 104 and/or the base station 102 may include a location component 198 that may be configured to transmit, for a network entity, a request for clutter information, where an indication of the clutter information is received based on the request. Location component 198 may also be configured to transmit, for the network entity, an indication of a filter capability associated with at least one filter of the wireless device. Location component 198 may also be configured to receive, from a network entity, an indication of clutter information from at least one sensing node or at least one sensor, where the clutter information is associated with one or more stationary or slow-moving reflections of one or more signals with respect to the at least one sensing node or the at least one sensor. Location component 198 may also be configured to configure at least one filter in a set of filters at the wireless device based on the clutter information from the at least one sensing node or the at least one sensor. Location component 198 may also be configured to perform a radio frequency (RF) sensing measurement for the at least one filter of the wireless device. Location component 198 may also be configured to transmit, for the network entity, an indication of the RF sensing measurement for the at least one filter of the wireless device. Location component 198 may also be configured to receive, from the network entity, an indication of at least one pulse repetition frequency (PRF) for the one or more signals.

In certain aspects, the LMF 166 and/or the set of locations servers 168 may include a location component 199 that may be configured to receive, from a wireless device, a request for clutter information, where an indication of the clutter information is transmitted based on the request. Location component 199 may also be configured to receive, from the wireless device, an indication of a filter capability associated with at least one filter of the wireless device. Location component 199 may also be configured to obtain clutter information from at least one sensing node or at least one sensor, where the clutter information is associated with one or more stationary or slow-moving reflections of one or more signals with respect to the at least one sensing node or the at least one sensor. Location component 199 may also be configured to transmit, for a wireless device, an indication of the clutter information from the at least one sensing node or the at least one sensor, where the clutter information is associated with at least one filter of the wireless device. Location component 199 may also be configured to receive, from the wireless device, an indication of a radio frequency (RF) sensing measurement for the at least one filter of the wireless device. Location component 199 may also be configured to schedule at least one pulse repetition frequency (PRF) for the one or more signals. Location component 199 may also be configured to transmit an indication of the at least one PRF for the one or more signals. Although the following description may be focused on 5G NR, the concepts described herein may be applicable to other similar areas, such as LTE, LTE-A, CDMA, GSM, and other wireless technologies.

Figures 2A, 2B, 2C, 2D:
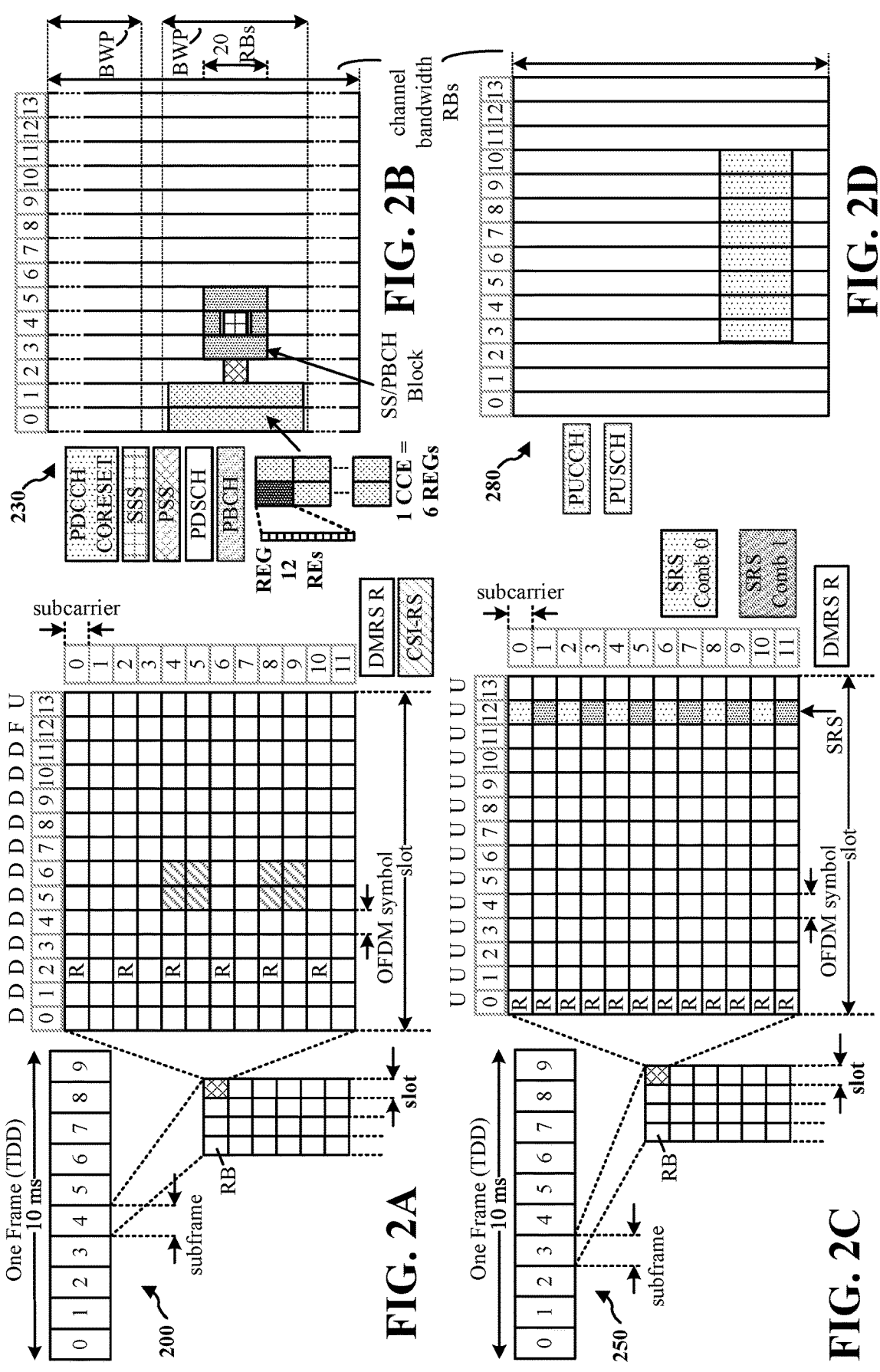
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to 2*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
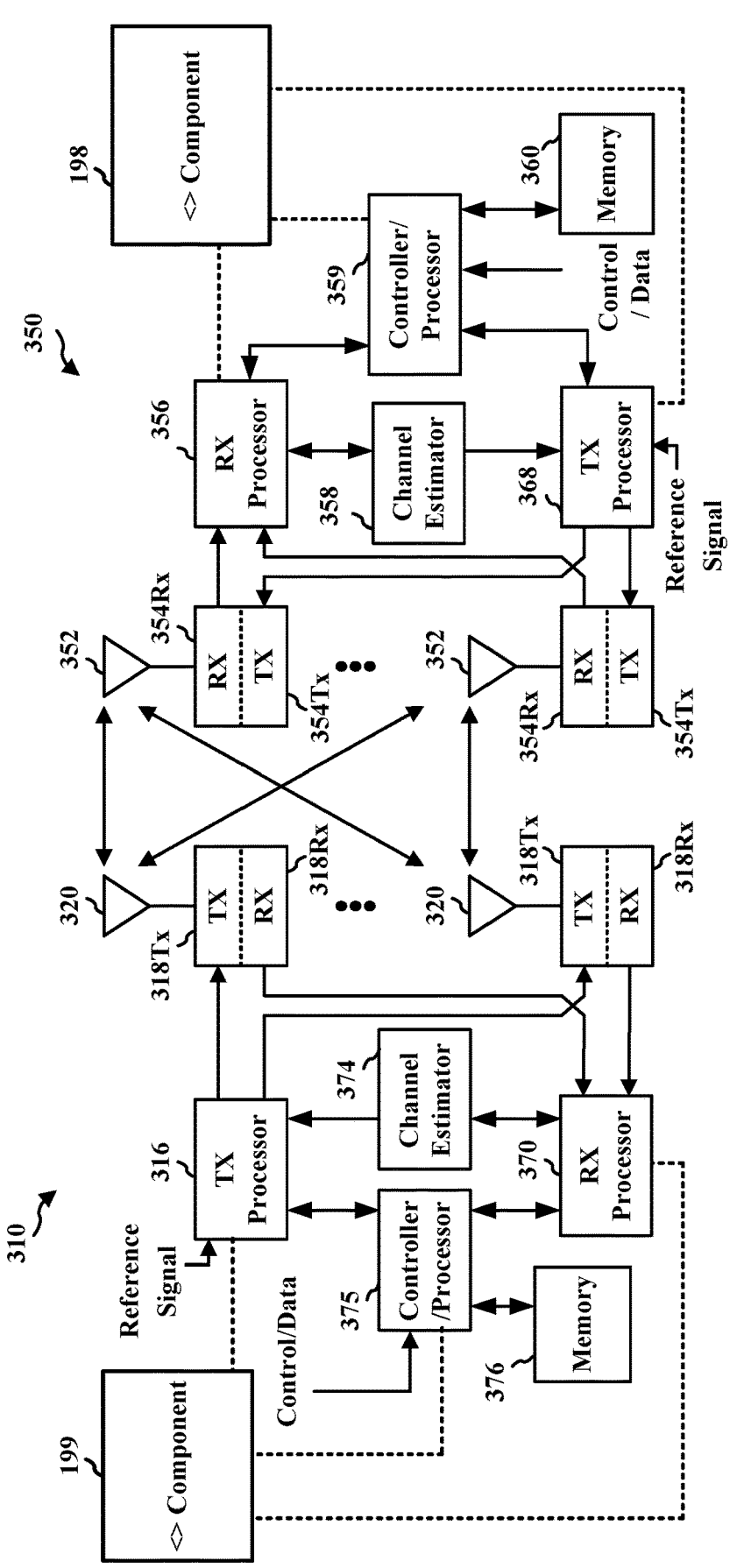
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the location component 198 of FIG. 1. At least one of the TX processor 316, the RX processor 370, and the controller/processor 375 may be configured to perform aspects in connection with the location component 199 of FIG. 1.

Figure 4:
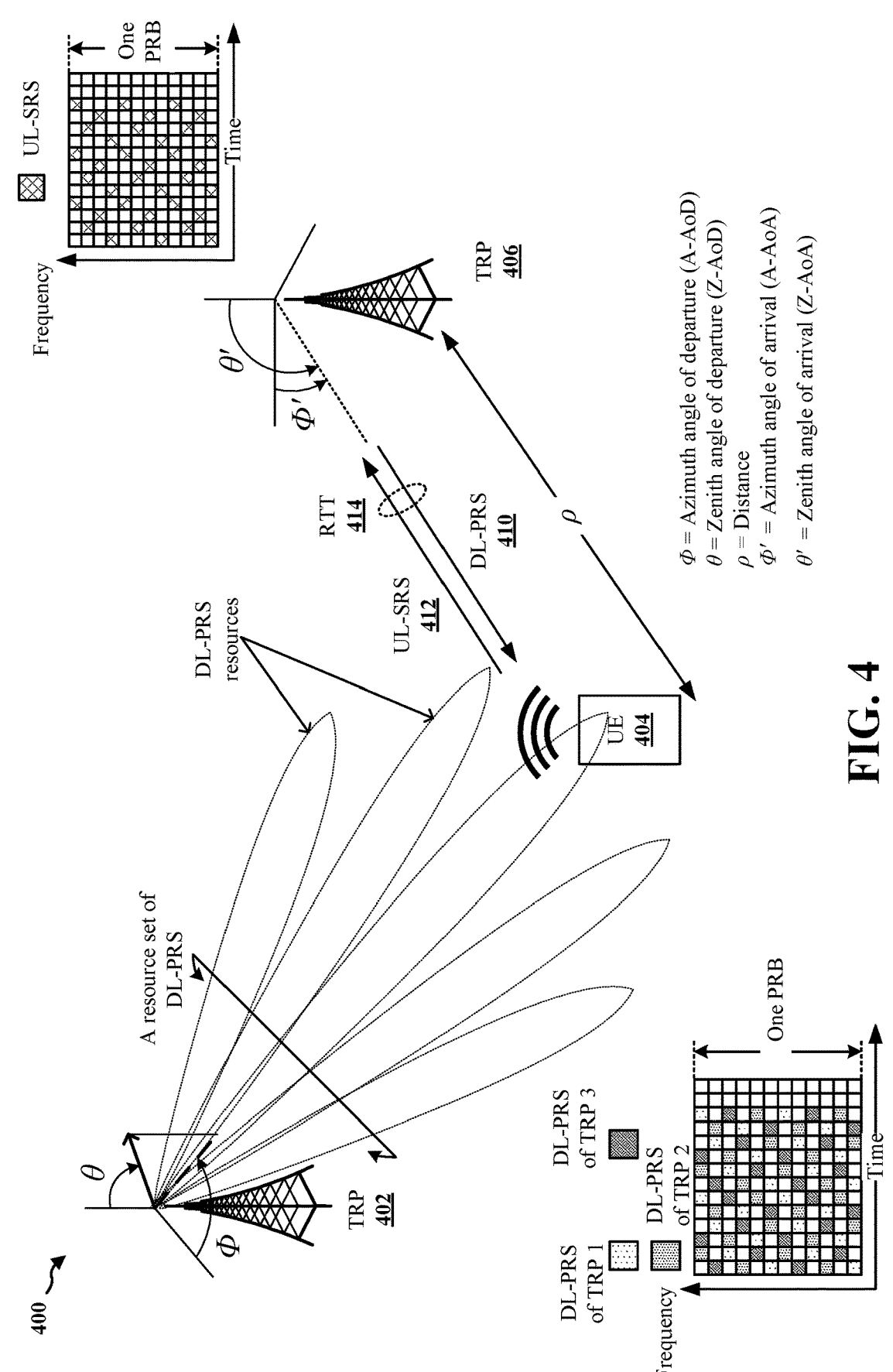
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s)168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and DL-PRS-RSRP of the received signals) using assistance data received from the positioning server, and the TRPs 402, 406 measure the gNB Rx-Tx time difference measurements (and UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406. DL-TDOA positioning may make use of the DL reference signal time difference (RSTD) (and DL-PRS-RSRP) of downlink signals received from multiple TRPs 402, 406 at the UE 404. The UE 404 measures the DL RSTD (and DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and UL-SRS-RSRP) at multiple TRPs 402, 406 of uplink signals transmitted from UE 404. The TRPs 402, 406 measure the UL-RTOA (and UL-SRS-RSRP) of the received signals using assistance data received from the positioning server, and the resulting measurements are used along with other configuration information to estimate the location of the UE 404. UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
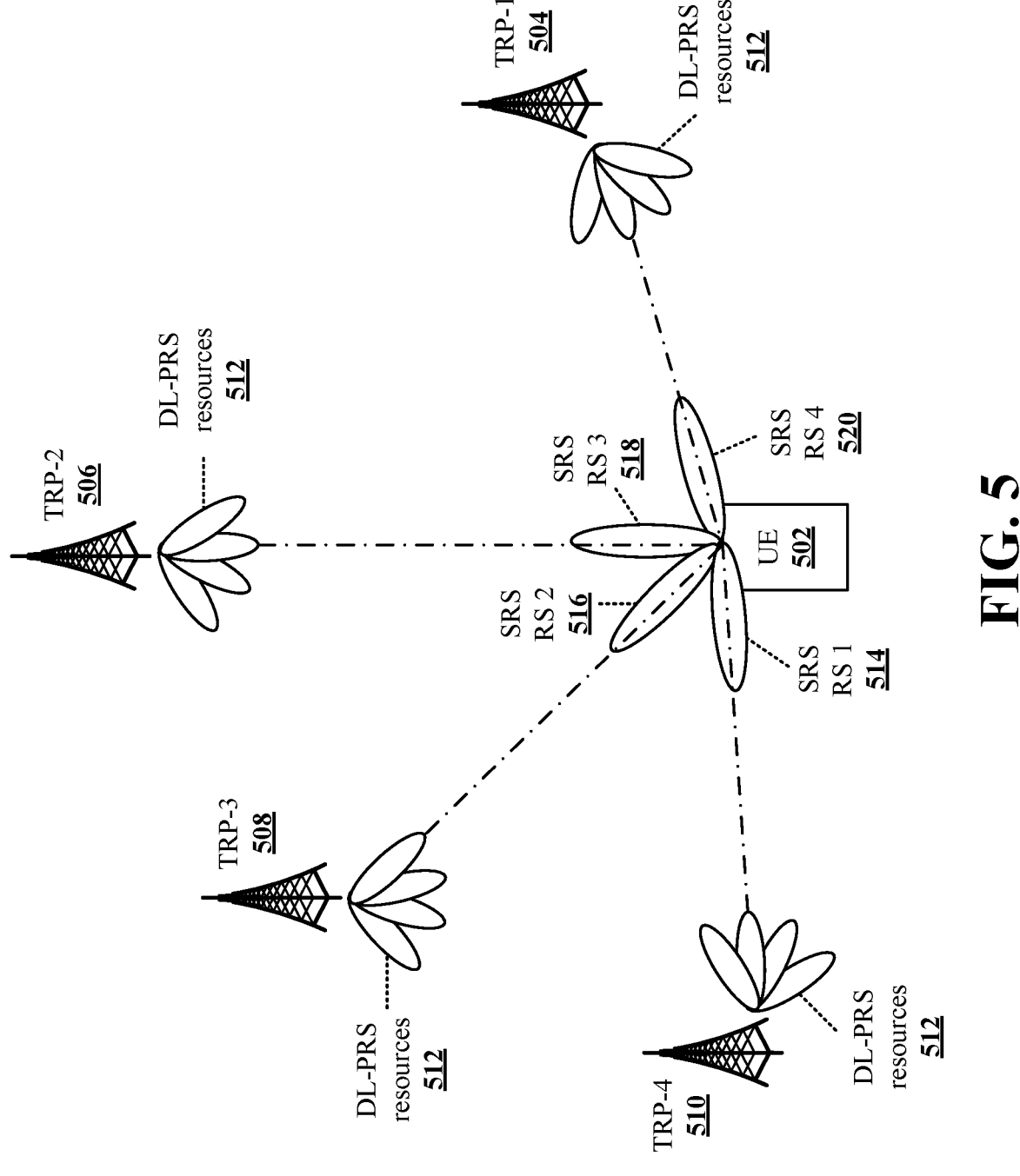
FIG. 5 is a diagram illustrating an example of a wireless communication system.

FIG. 5 is a diagram 500 illustrating an example of estimating a position of a UE based on multi-RTT measurements from multiple TRPs in accordance with various aspects of the present disclosure. A UE 502 may be configured by a serving base station to decode DL-PRS resources 512 that correspond to and are transmitted from a first TRP 504 (TRP-1), a second TRP 506 (TRP-2), a third TRP 508 (TRP-3), and a fourth TRP 510 (TRP-4). The UE 502 may also be configured to transmit UL-SRSs on a set of UL-SRS resources, which may include a first SRS resource 514, a second SRS resource 516, a third SRS resource 518, and a fourth SRS resource 520, such that the serving cell(s), e.g., the first TRP 504, the second TRP 506, the third TRP 508, and the fourth TRP 510, and as well as other neighbor cell(s), may be able to measure the set of the UL-SRS resources transmitted from the UE 502. For multi-RTT measurements based on DL-PRS and UL-SRS, as there may be an association between a measurement of a UE for the DL-PRS and a measurement of a TRP for the UL-SRS, the smaller the gap is between the DL-PRS measurement of the UE and the UL-SRS transmission of the UE, the better the accuracy may be for estimating the position of the UE and/or the distance of the UE with respect to each TRP.

In some aspects of wireless communication, the terms "positioning reference signal" and "PRS" may generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. In some aspects, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 6:
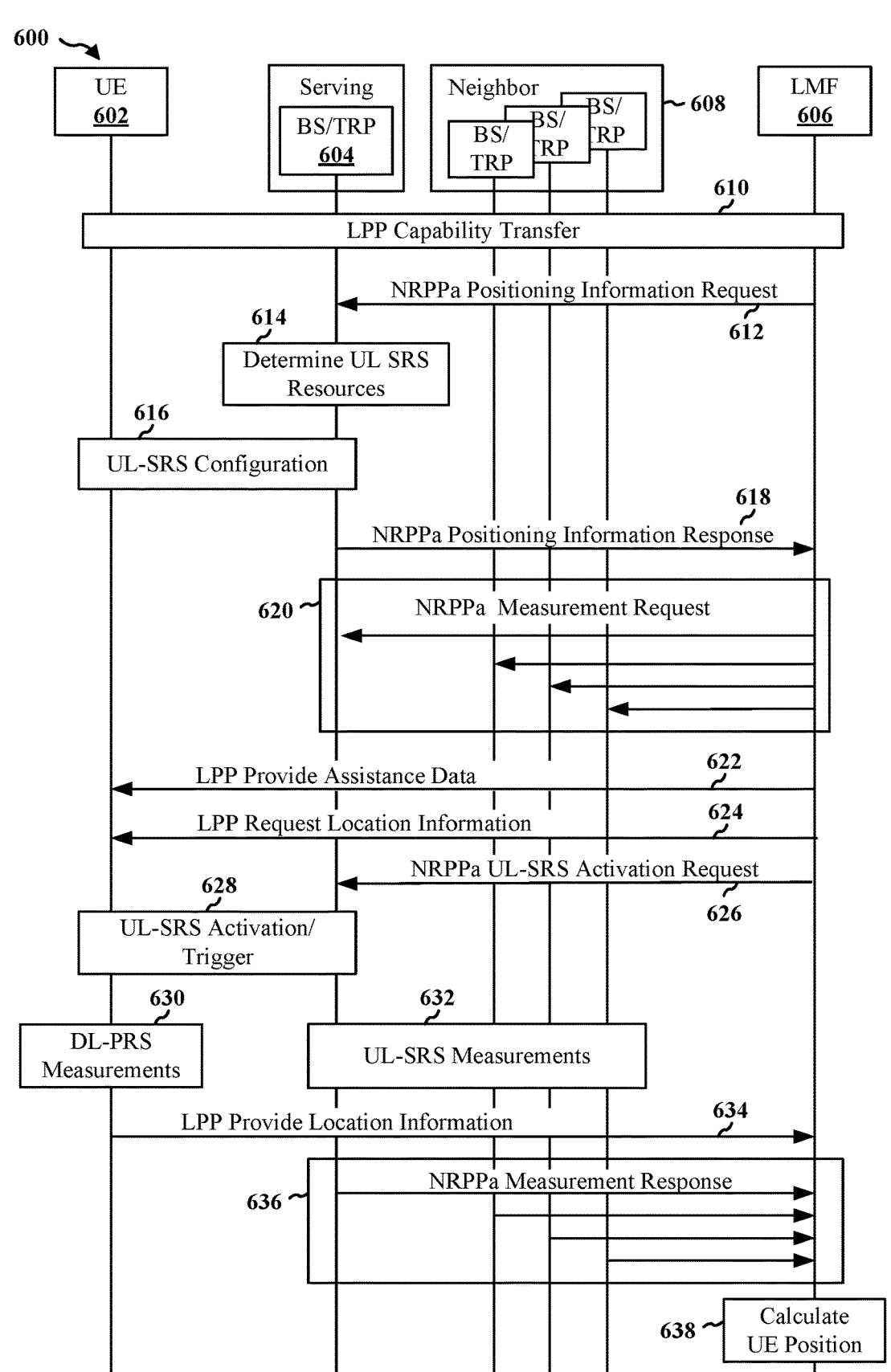
FIG. 6 is a diagram illustrating an example positioning procedure.

FIG. 6 is a communication flow 600 illustrating an example multi-RTT positioning procedure in accordance with various aspects of the present disclosure. The numberings associated with the communication flow 600 do not specify a particular temporal order and are merely used as references for the communication flow 600. In addition, a DL-only and/or an UL-only positioning may use a subset or subsets of this multi-RTT positioning procedure.

At 610, an LMF 606 may request one or more positioning capabilities from a UE 602 (e.g., from a target device). In some examples, the request for the one or more positioning capabilities from the UE 602 may be associated with an LTE Positioning Protocol (LPP). For example, the LMF 606 may request the positioning capabilities of the UE 602 using an LPP capability transfer procedure. At 612, the LMF 606 may request UL SRS configuration information for the UE 602. The LMF 606 may also provide assistance data specified by a serving base station 604 (e.g., pathloss reference, spatial relation, and/or SSB configuration(s), etc.). For example, the LMF 606 may send an NR Positioning Protocol A (NRPPa)

positioning information request message to the serving base station 604 to request UL information for the UE 602.

At 614, the serving base station 604 may determine resources available for UL SRS, and at 616, the serving base station 604 may configure the UE 602 with one or more UL SRS resource sets based on the available resources. At 618, the serving base station 604 may provide UL SRS configuration information to the LMF 606, such as via an NRPPa positioning information response message. At 620, the LMF 606 may select one or more candidate neighbor BSs/TRPs 608, and the LMF 606 may provide an UL SRS configuration to the one or more candidate neighbor BSs/TRPs 608 and/or the serving base station 604, such as via an NRPPa measurement request message. The message may include information for enabling the one or more candidate neighbor BSs/TRPs 608 and/or the serving base station to perform the UL measurements.

At 622, the LMF 606 may send an LPP provide assistance data message to the UE 602. The message may include specified assistance data for the UE 602 to perform the DL measurements. At 624, the LMF 606 may send an LPP request location information message to the UE 602 to request multi-RTT measurements. At 626, for semi-persistent or aperiodic UL SRS, the LMF 606 may request the serving base station 604 to activate/trigger the UL SRS in the UE 602. For example, the LMF 606 may request activation of UE SRS transmission by sending an NRPPa positioning activation request message to the serving base station 604.

At 628, the serving base station 604 may activate the UE SRS transmission and send an NRPPa positioning activation response message. In response, the UE 602 may begin the UL-SRS transmission according to the time domain behavior of UL SRS resource configuration. At 630, the UE 602 may perform the DL measurements from the one or more candidate neighbor BSs/TRPs 608 and/or the serving base station 604 provided in the assistance data. At 632, each of the configured one or more candidate neighbor BSs/TRPs 608 and/or the serving base station 604 may perform the UL measurements. At 634, the UE 602 may report the DL measurements to the LMF 606, such as via an LPP provide location information message. At 636, each of the one or more candidate neighbor BSs/TRPs 608 and/or the serving base station 604 may report the UL measurements to the LMF 606, such as via an NRPPa measurement response message. At 638, the LMF 606 may determine the RTTs from the UE 602 and BS/TRP Rx-Tx time difference measurements for each of the one or more candidate neighbor BSs/TRPs 608 and/or the serving base station 604 for which corresponding UL and DL measurements were provided at 634 and 636, and the LMF 606 may calculate the position of the UE 602.

Some aspects of wireless communication may experience clutter (i.e., stationary reflections associated with signals or radar). For example, clutter may include unwanted stationary reflections with limited relative motion with respect to a certain target. The power spectral density (PSD) of clutter may be concentrated around certain frequencies (e.g., direct current (DC)). Further, clutter may exhibit some Doppler frequency spread, such that the overall clutter spreading is not equal to zero. In radar literatures, the overall clutter spreading may be modeled by a certain formula. For example, the overall clutter spreading may be modeled as:

$$\sigma_f^2 = \sigma_v^2 + \sigma_s^2 + \sigma_w^2,$$

where $$\sigma_v^2$$

corresponds to clutter spread due to platform motion, $$\sigma_s^2$$

corresponds to antenna scan rate, and $$\sigma_w^2$$

corresponds to clutter spread due to wind.

Clutter may originate from the same range or angle cell as a target location. The radar cross section (RCS) of clutter may be larger than a target of interest (e.g., greater than 50 dB). The characteristics of clutter may vary with certain types of terrain (e.g., land or water), weather (e.g., rain or snow), etc. Additionally, there may be a number of different types of clutter, each of which may include a different relative power (in dB). For example, clutter may include land clutter, water or sea clutter, rain clutter, chaff clutter, bird clutter, and aircraft clutter.

Figure 7:
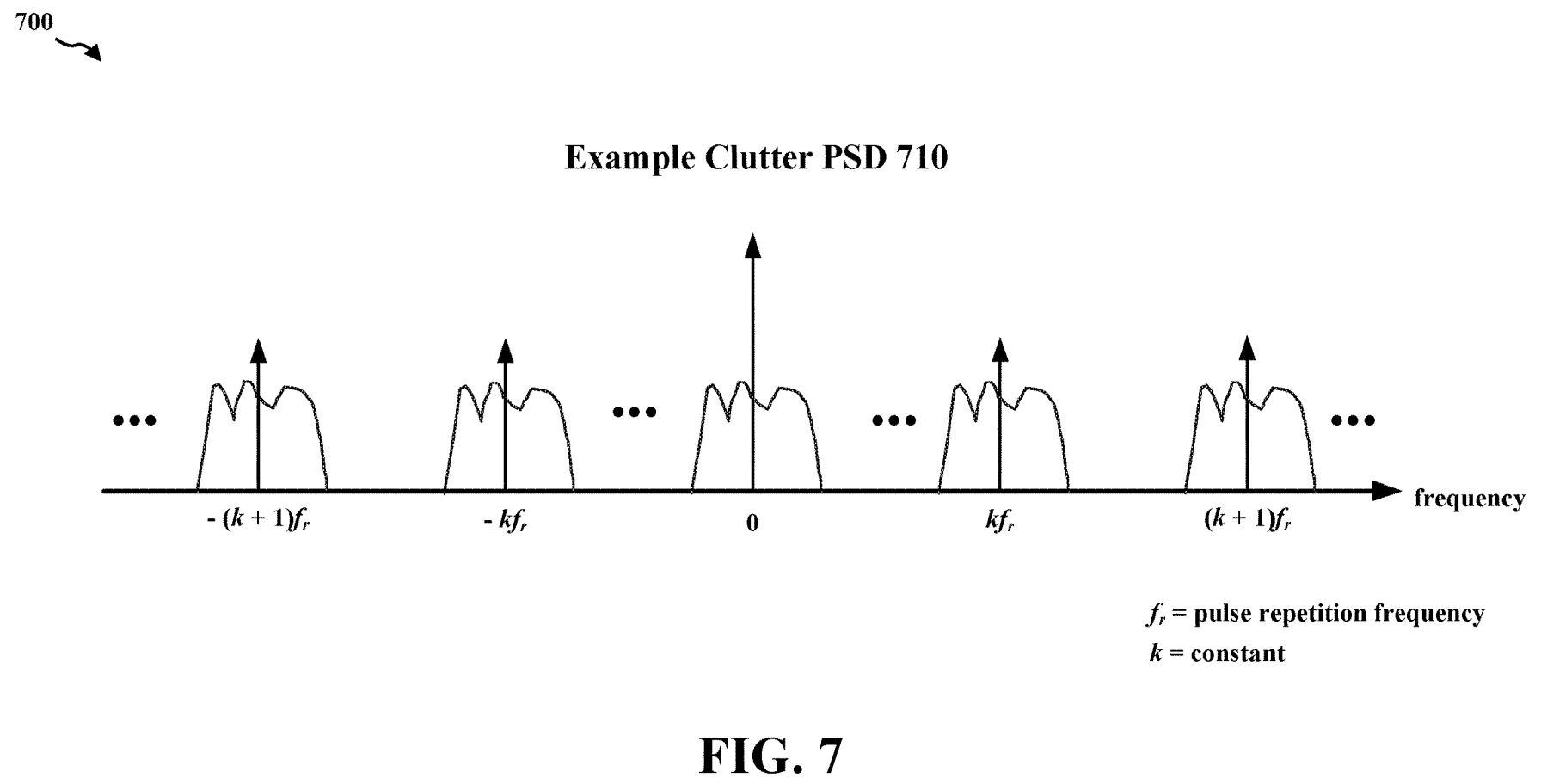

FIG. 7 is a graph 700 illustrating an example power spectral density (PSD) of clutter. More specifically, FIG. 7 depicts clutter PSD compared to a pulse repetition frequency. As shown in FIG. 7, graph 700 includes example clutter PSD 710 charted against frequency, as well as including a pulse repetition frequency ($f_r$) and a constant (k). For example, the example clutter PSD 710 is compared to the following frequency values: $-(k+1)-f_r$, $-k \cdot f_r$, 0, $k \cdot f_r$, and $(k+1) \cdot f_r$.

Some types of radar systems (e.g., pulsed radar systems) may utilize special types of filters that can distinguish between slow-moving or stationary targets and fast-moving targets. For example, one class of these types of filters is known as a moving target indicator (MTI) or MTI filter. The purpose of an MTI filter may be to suppress target-like returns produced by clutter. Further, MTI filters may allow returns from moving targets to pass through with little or no degradation. In order to effectively suppress clutter returns, an MTI filter may need to have a deep stopband at direct current (DC) and at integer multiples of the pulse repetition frequency (PRF), $f_r$. In some aspects, DC may correspond to a frequency value of 0 Hz.

Figure 8:
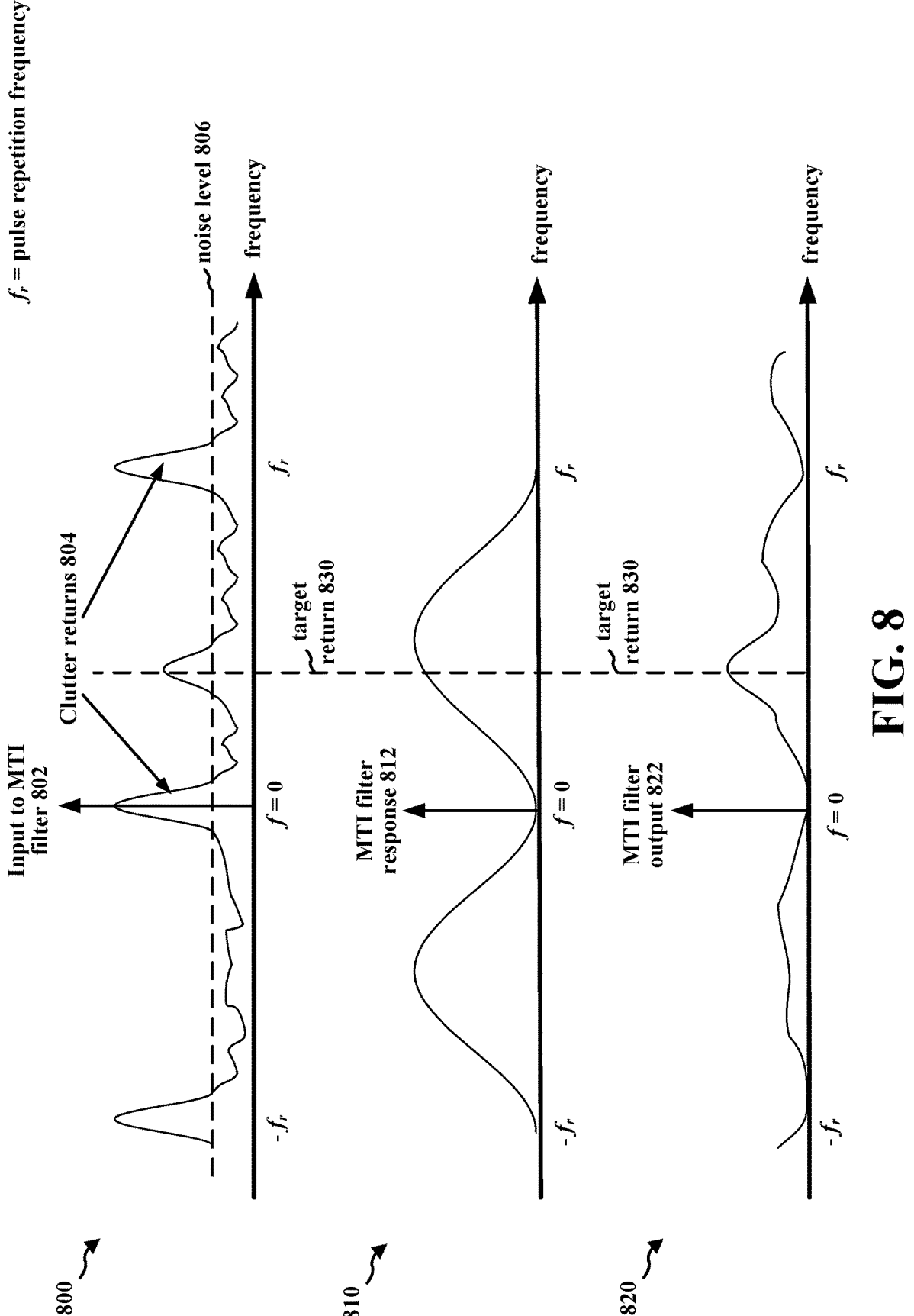
FIG. 8 is a graph illustrating example clutter compared to frequency.

FIG. 8 includes graph 800, graph 810, and graph 820 that illustrate example clutter compared to frequency. More specifically, FIG. 8 depicts an input to an MTI filter, an MTI filter response, and an output to an MTI filter charted against a frequency. As shown in FIG. 8, graph 800 includes an input to MTI filter 802, clutter returns 804, noise level 806, and a target return 830. Graph 800 also shows that the input to MTI filter 802 is around a frequency value of zero, as well as depicts the positive and negative values of the pulse repetition frequency ($f_r$). Graph 810 includes an MTI filter response 812 and target return 830. Also, graph 810 shows that the MTI filter response 812 is a function of frequency (e.g., around a frequency value of zero), as well as depicts the positive and negative values of the pulse repetition frequency ($f_r$). Graph 820 includes an MTI filter output 822 and target return 830. Further, graph 820 shows that the MTI filter output 822 corresponds to clutter around a frequency value of zero being filtered out or nulled, as well as depicts the positive and negative values of the pulse repetition frequency $(f_r)$.

In some aspects, MTI filters may be implemented using delay line cancelers. A delay line canceler is a filter that eliminates the direct current (DC) components of echo signals received from stationary targets. That is, a delay line canceler may allow non-zero frequency components (e.g., components with a frequency that is larger than a threshold value) of echo signals received from non-stationary targets (i.e., moving targets). The frequency response of this class of MTI filter may be periodic, with nulls at integer multiples of the pulse repetition frequency. Also, the shape of the MTI filter may be designed by introducing a recursive feedback into the MTI filter. In MTI filters with delay line cancelers, there may be a single delay line canceler (e.g., a two-pulse MTI) or a double delay line canceler (e.g., a three-pulse MTI). A three-pulse delay line canceler may provide a wider clutter notch and greater clutter attenuation compared to a two-pulse delay line canceler.

Figures 9A, 9B:
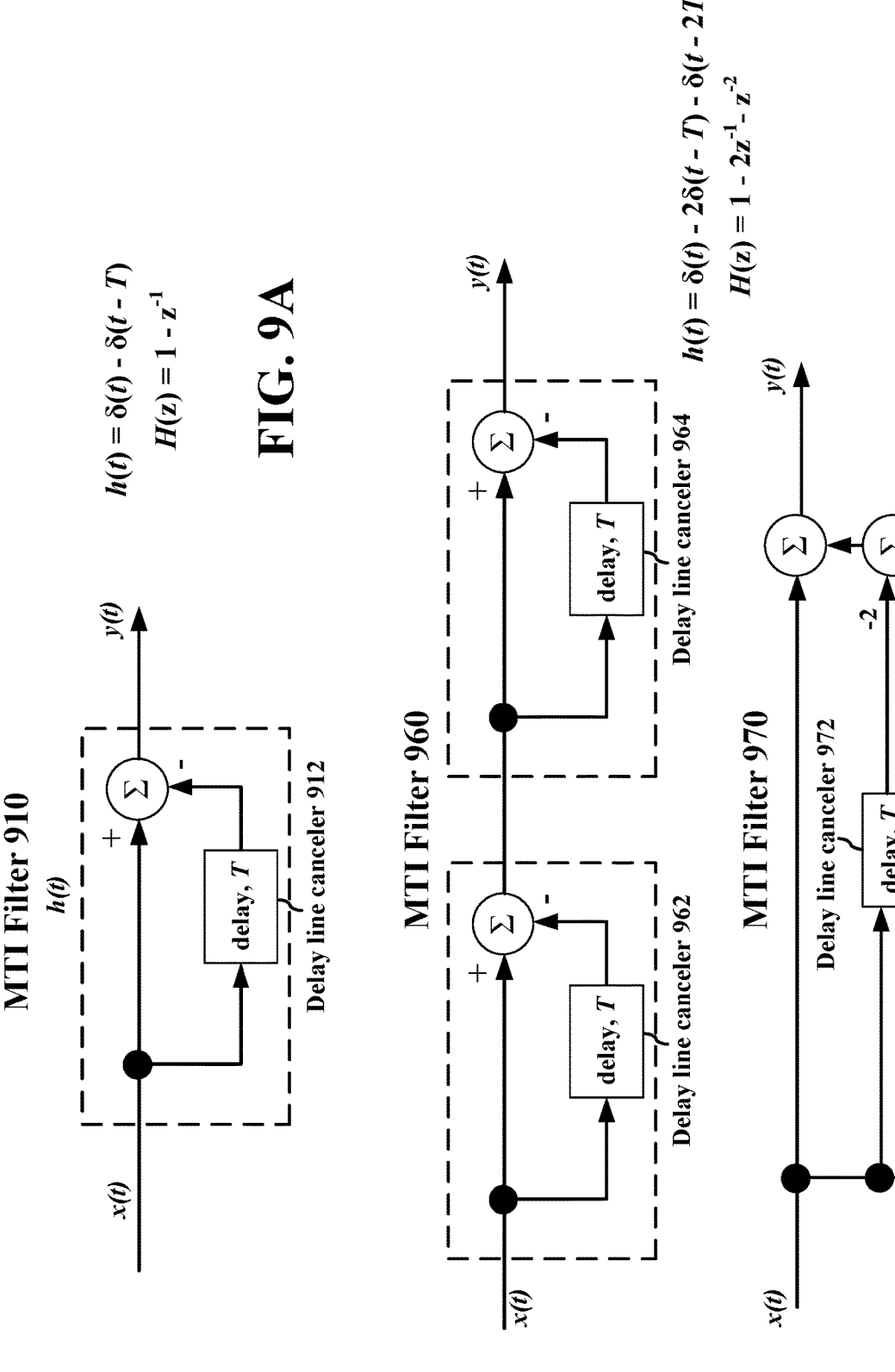
FIG. 9A is a diagram illustrating an example MTI filter using a delay line canceler.
FIG. 9B is a diagram illustrating example MTI filters using delay line cancelers.

FIG. 9A and FIG. 9B include diagram 900 and diagram 950, respectively, illustrating example MTI filters using delay line cancelers. More specifically, FIG. 9A depicts an MTI filter using a single delay line canceler. As shown in FIG. 9A, diagram 900 includes MTI filter 910 with delay line canceler 912. Diagram 900 also includes an input, x(t), and an output, y(t), of the filter. MTI filter 910 is also associated with two formulas: $h(t)=\delta(t)-\delta\cdot(t-T)$, and $H(z)=1-z^{-1}$. FIG. 9B depicts an MTI filter using double delay line cancelers. As shown in FIG. 9B, diagram 950 includes MTI filter 960 with delay line canceler 962 and delay line canceler 964. MTI filter 960 also includes an input, x(t), and an output, y(t), of the filter. Further, MTI filter 970 includes delay line canceler 972, delay line canceler 974, and delay line canceler 976. MTI filter 970 also includes an input, x(t), and an output, y(t), of the filter. MTI filter 960 and MTI filter 970 are also associated with system responses in time domain and Z domain: $h(t)=\delta(t)-2\delta\cdot(t-T)-\delta\cdot(t-2T)$, and $H(z)=1-2z^{-1}-z^{-2}$.

In some aspects, targets with Doppler frequencies equal to certain values (e.g., $kf_r$) may be severely attenuated. Target speeds that produce Doppler frequencies equal to $kf_r$ may be referred to as blind speeds: $v_{blind}=(k\lambda f_r)/2$. Blind speeds may pose serious limitations on the performance of MTI radars and their ability to perform adequate target detection. In order to resolve the issue of blind speed, the pulse repetition frequency (PRF) may be increased, so the radar may have a range ambiguity issue. In order to resolve the issue of blind speeds, multiple PRF schemes may be utilized (i.e., utilize PRF staggering).

Figure 10:
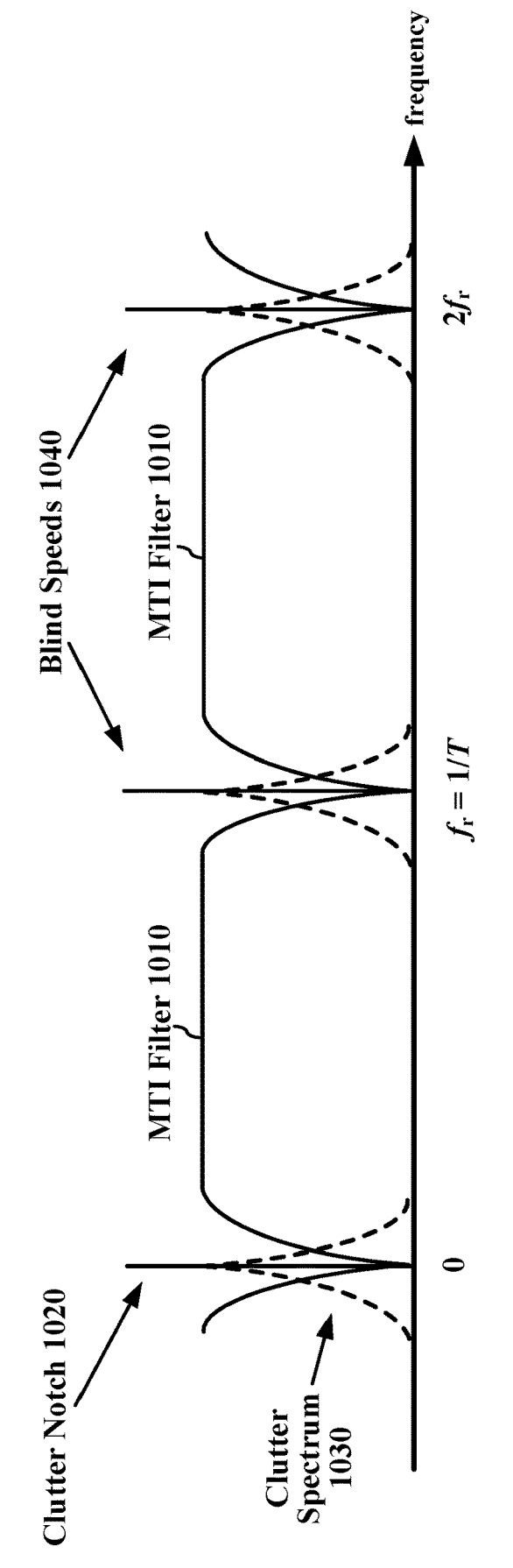
FIG. 10 is a graph illustrating an example frequency for an MTI filter.

FIG. 10 is a graph 1000 illustrating an example frequency for an MTI filter. More specifically, FIG. 10 depicts a frequency for an MTI filter and corresponding blind speeds, clutter notch, and clutter spectrum. As shown in FIG. 10, graph 1000 includes a frequency for MTI filter 1010, clutter notch 1020, clutter spectrum 1030, and blind speeds 1040. The frequency values on graph 1000 correspond to values of 0, $f_r$ (i.e., 1/T), and $2f_r$ (i.e., 2/T). As shown in FIG. 10, the blind speeds 1040 correspond to frequency values of $f_r$ (i.e., 1/T) and $2f_r$ (i.e., 2/f). The clutter notch 1020 corresponds to a frequency value of 0.

As indicated above, in order to resolve the issue of blind speeds, multiple PRF schemes may be utilized (i.e., with PRF staggering). PRF staggering is staggering or changing the pulse repetition interval between consecutive pulses. PRF staggering may mitigate the effect of blind speeds, such as by extending a first blind speed to a more tolerable value. For instance, an MTI filter response with PRF staggering (e.g., a two pulse MTI) may extend a blind speed to a more tolerable value. For example, for a first PRF of $1/T_1$ and a second PRF of $1/T_2$, PRF staggering may adjust the pulse repetition interval between consecutive pulses, which may mitigate the effect of blind speeds.

In some aspects, the design of MTI filters may depend on a clutter power spectral density and target speed. The selection of MTI filters may also depend on the design of radar reference signals (RSs). For periodic radar RSs, the periodicity may decide the clutter notch frequency and the blind speed. The radar transmitter (Tx) may need to be aware of which type of MTI is supported by the radar receiver (Rx). Based on the above, it may be beneficial to enhance MTI-based radio frequency (RF) sensing in cellular systems. It may also be beneficial for the MTI filter to operate in bi-static or multi-static cases. For example, it may be beneficial for the Tx radar and the Rx radar to be different network nodes in a cellular system.

Aspects of the present disclosure may enhance MTI-based radio frequency (RF) sensing in cellular systems. For example, aspects presented herein may utilize adaptive MTI-based RF sensing in cellular systems. In some instances, aspects presented herein may also utilize MTI filters that operate in bi-static or multi-static cases. Additionally, aspects presented herein may utilize radar Tx and radar Rx that are different network nodes in a cellular system. Also, aspects presented herein may utilize MTI filters that are associated with clutter information. Moreover, aspects presented herein may enhance RF sensing measurement reports. Further, aspects presented herein may utilize adaptive pulse repetition frequency (PRF) for MTI filters.

In some aspects, MTI filters may distinguish between slow-moving or stationary targets and fast-moving targets by suppressing target-like returns produced by clutter. MTI filters may also allow returns from moving targets to pass through with little or no degradation. Additionally, aspects presented herein may utilize enhancements to MTI-based RF sensing in cellular systems. In one aspect, clutter information may be signaled to a wireless device (e.g., gNB or UE) as assistance data for MTI filter designs. Also, aspects presented herein may vary clutter power spectral density (PSD) across location and/or time, which may be helpful in optimizing MTI filters. Furthermore, aspects presented herein may utilize MTI filtering, which may improve RF sensing measurements. Moreover, aspects presented herein may increase or stagger the pulse repetition frequency (PRF) in order to avoid blind speeds.

Aspects presented herein may utilize clutter information-based MTI filter design. In some instances, the clutter power spectral density (PSD) for MTI filters may vary across both location and time. For a mobile wireless device (e.g., a UE) with a varying location, the wireless device may observe clutter with different PSD based on the varying location and/or time. Also, for a wireless device (e.g., a base station or gNB) with a fixed location or a fixed serving area, the radar Rx may observe clutter with a different PSD over time.

Also, aspects presented herein may allow for wireless devices to collect clutter information. For instance, in order to aid the wireless device (e.g., gNB or UE) to optimize its MTI filters, a network entity (e.g., an RF sensing server) may collect clutter information from an RF sensing node or other sensors across the network (e.g., camera, radar, lidar, etc.). In some aspects, a sensing node (e.g., an RF sensing node) may report the PSD of the clutter with a time stamp and a location of the sensing node. Additionally, the sensing node may report the detected clutter with a time stamp and a location of the sensing node. For example, the classification of the clutter (e.g., rain clutter) may be reported by the sensing node. In order to reduce the overhead and complexity, a class of clutter may be reported to the network entity (e.g., RF sensing server). Further, an identifier (ID) of the clutter may be defined and/or signaled to the network entity (e.g., RF sensing server) or the wireless device (e.g., gNB or UE).

In some aspects, the clutter information may be signaled to a wireless device (e.g., gNB or UE) as certain data (e.g., assistance data) for MTI filter designs. The network entity (e.g., RF sensing server) may fuse or blend the reported clutter information across different sensing nodes. The fused clutter information may be signaled to the sensing node as assistance data for MTI filter designs. In some instances, the clutter information may be periodically signaled to the wireless device (e.g., gNB or UE). Also, the sensing node may request (e.g., on-demand request) the assistance data or clutter information.

Additionally, in some instances, aspects presented herein may utilize an enhancement of RF sensing measurement reports. As indicated above, aspects presented herein may provide for a fusion of RF sensing measurement(s) from different sensing nodes. The fusion of RF sensing measurement(s) from different sensing nodes may enhance the accuracy and robustness of the RF sensing. For example, the fusion of RF sensing measurements may combat radar cross section (RCS) fading. Aspects presented herein may also include an indication of an MTI filter, such as an MTI filter that is adopted at the sensing node. The indication of MTI filter that is adopted at the sensing node may enhance the fusion or blending of the sensing measurement. Different types of MTI filters may result in different blind speeds (i.e., target speeds that produce Doppler frequencies equal to certain values, such as $kf_r$). Moreover, different types of MTI filters may have different types of frequency responses. Further, the width of clutter notch and the level of clutter attenuation may be utilized as information.

In some aspects, the fusion or blending of the sensing measurement(s) may be implemented by a certain type of filter (e.g., a Kalman filter) or advanced machine learning (ML) algorithms. Also, the MTI filter information may aid the fusion engine design. For example, the blind speed derived from the MTI filter may provide less confidence to the Doppler measurement near the blind speed. Aspects presented herein may also provide different weights for measurements with different MTI filters. For instance, a measurement with a three-pulse MTI filter (e.g., including a double delay line canceler) may have more weight compared to a measurement with a two-pulse MTI filter (e.g., including a single delay line canceler). For example, a three-pulse MTI filter (e.g., including a double delay line canceler) may provide a wider clutter notch and greater clutter attenuation compared to a two-pulse MTI filter (e.g., including a single delay line canceler).

Also, when the sensing node reports the measurement to the network entity (e.g., a sensing server), there may be a number of different options. For instance, the sensing node may indicate the MTI filter information within the measurement report to the network entity (e.g., a sensing server). For example, the MTI filter information may include the MTI type, the frequency response of the MTI filter, etc. If the MTI information is not indicated, the network entity (e.g., RF sensing server) may assume that no MTI filter is applied at the sensing node. Additionally, a sensing node may report its capability to support MTI filters. In these instances, the sensing node may not be willing disclose the MTI filter information. Further, the sensing node may implicitly indicate that it may use a certain type of MTI filter based on the capability report.

Additionally, in some instances, aspects presented herein may utilize adaptive pulse repetition frequency (PRF) for MTI filters. For instance, by increasing the PRF for an MTI filter, aspects presented herein may reduce or avoid blind speeds. By doing so, the range ambiguity may not be an issue in a cellular system, as each orthogonal frequency division multiplexing (OFDM) symbol duration may be longer than a round-trip delay. Aspects presented herein may also utilize a number of different allocations for radar reference signals (RSs). For instance, a radar RS PRF may be larger than the highest frequency of the clutter PSD. Further, the wireless device (e.g., gNB or UE) may schedule a radar RS according to the clutter information provided by the network entity (e.g., sensing server). The radar RS PRF may also be larger than the maximum Doppler defined by the use case of the RF sensing node. The sensing node may indicate, to the sensing server, its preference for radar RS PRF according its use cases. Also, the radar RS PRF may not be too high for system level spectrum efficiency, unless it does not meet the above conditions (e.g., the radar RS PRF may be larger than the highest frequency of the clutter PSD, and the radar RS PRF may also be larger than the maximum Doppler defined by the use case of the RF sensing node).

Moreover, aspects presented herein may avoid blind speeds by enabling PRF staggering. For instance, multiple radar RS resource sets may be scheduled, where each resource set is associated with different periodicity. The selection of the periodicity may consider the frequency response of the MTI filter. As such, the number of resource sets and the periodicity of each resource set may consider the sensing node's capability of MTI filter implementation and the clutter PSD. Further, aspects presented herein may associate one or more aperiodic sensing RSs with one or more periodic sensing RSs. By doing so, this may result in a trade-off between performance and spectrum efficiency. Additionally, aspects presented herein may associate one or more aperiodic sensing RSs with one or more aperiodic sensing RSs. By doing so, this may enable one-shot sensing, but with high spectrum efficiency. Also, a wireless device (e.g., UE or gNB) may use the associated radar RS as the input of the MTI filter.

Aspects of the present disclosure may include a number of benefits or advantages. For instance, aspects presented herein may enhance MTI-based radio frequency (RF) sensing in cellular systems. In some aspects, clutter information may be signaled to a wireless device (e.g., gNB or UE) as assistance data for MTI filter designs. Also, aspects presented herein may vary clutter PSD across location and/or time, which may be helpful in optimizing MTI filters. Furthermore, aspects presented herein may utilize MTI filtering, which may improve RF sensing measurements. Moreover, aspects presented herein may increase or stagger the PRF in order to reduce or avoid blind speeds.

Figure 11:
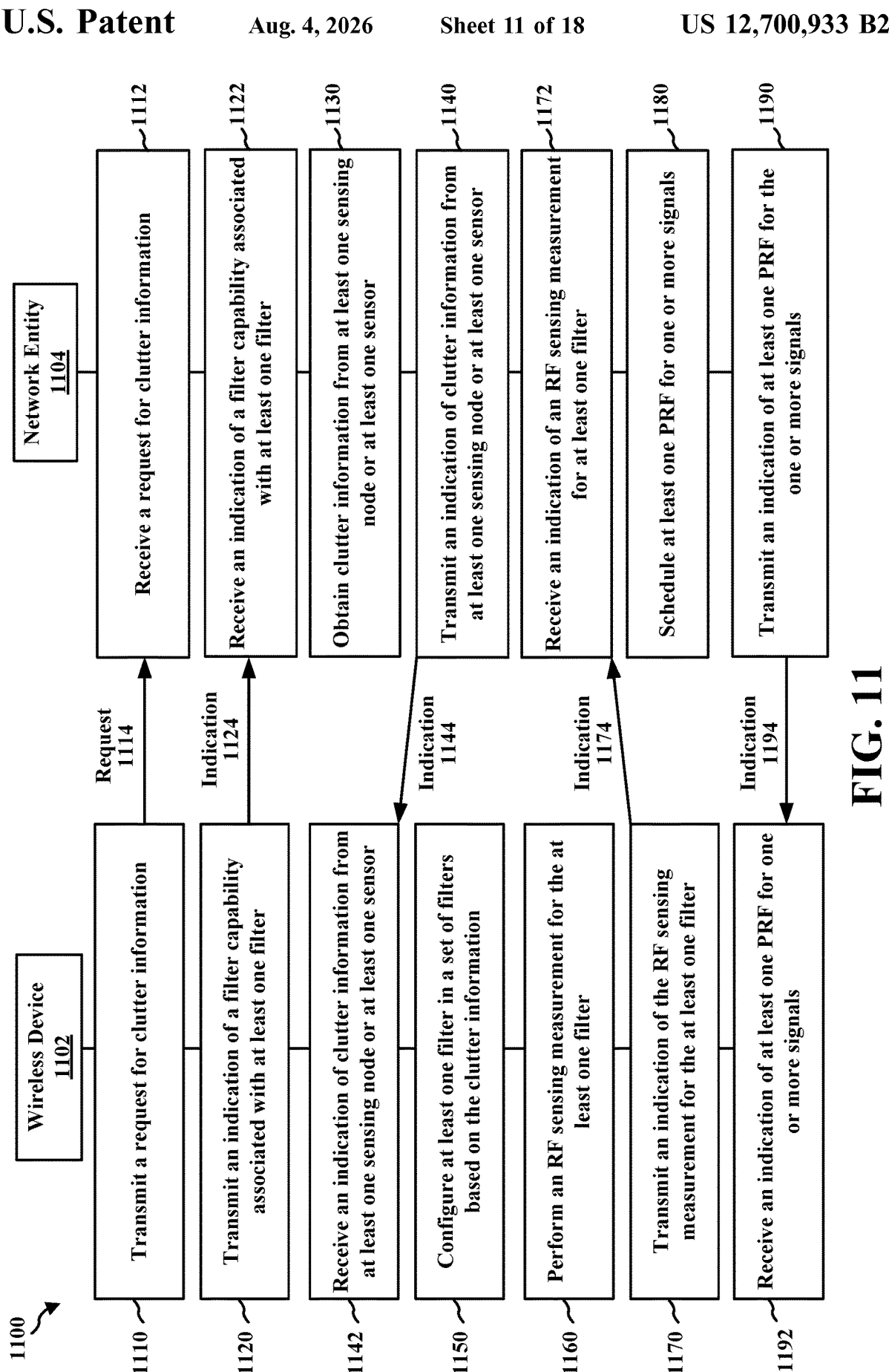
FIG. 11 is a communication flow diagram illustrating example communications between a wireless device and a network entity.

FIG. 11 is a communication flow diagram 1100 of wireless communication in accordance with one or more techniques of this disclosure. As shown in FIG. 11, diagram 1100 includes example communications between wireless device 1102 (e.g., a UE or a base station) and a network entity 1104 (e.g., a server or a sensing server), in accordance with one or more techniques of this disclosure. In some aspects, wireless device 1102 may be a first wireless device (e.g., UE, base station, TRP, or network entity) and network entity

1104 may be a second wireless device (e.g., UE, base station, TRP, or network entity).

At 1110, wireless device 1102 may transmit, for a network entity (e.g., network entity 1104), a request for clutter information (e.g., request 1114), where an indication of the clutter information is received based on the request.

At 1112, network entity 1104 may receive, from a wireless device (e.g., wireless device 1102), a request for clutter information (e.g., request 1114), where an indication of the clutter information is transmitted based on the request.

At 1120, wireless device 1102 may transmit, for the network entity, an indication of a filter capability (e.g., indication 1124) associated with at least one filter of the wireless device. The indication of the filter capability may include at least one type of the at least one filter, or the at least one filter may be at least one moving target indicator (MTI) filter and the indication of the filter capability may include at least one type of the at least one MTI filter.

At 1122, network entity 1104 may receive, from the wireless device, an indication of a filter capability (e.g., indication 1124) associated with at least one filter of the wireless device. The indication of the filter capability may include at least one type of the at least one filter, or the at least one filter may be at least one moving target indicator (MTI) filter and the indication of the filter capability may include at least one type of the at least one MTI filter.

At 1130, network entity 1104 may obtain clutter information from at least one sensing node or at least one sensor, where the clutter information is associated with one or more stationary or slow-moving reflections of one or more signals with respect to the at least one sensing node or the at least one sensor. For example, the clutter information may be associated with stationary reflections of one or more signals (with respect to a sensing node or sensor) and/or slow-moving reflections of one or more signals (with respect to a sensing node or sensor). That is, the reflections of the signals may be stationary or slow-moving (i.e., moving at a speed that is less than a reflection speed threshold). In order to distinguish between slow-moving/stationary reflections and fast-moving reflections, a certain type of filter may be utilized. For example, as indicated above, one class of these types of filters is known as a moving target indicator (MTI) or MTI filter. The purpose of an MTI filter may be to suppress target-like returns produced by clutter. Further, MTI filters may allow returns from moving reflections/targets to pass through with little or no degradation. In order to effectively suppress clutter returns, an MTI filter may need to have a deep stopband at DC and at integer multiples of the PRF, $f_r$. In some aspects, DC may correspond to a frequency value of 0 Hz. Additionally, the clutter information may include at least one of: a power spectral density (PSD) of clutter associated with the clutter information, a classification of the clutter associated with the clutter information, a time stamp of the at least one sensing node or the at least one sensor, or a location of the at least one sensing node or the at least one sensor.

At 1140, network entity 1104 may transmit, for a wireless device, an indication of the clutter information from the at least one sensing node or the at least one sensor (e.g., indication 1144), where the clutter information is associated with at least one filter of the wireless device. The indication of the clutter information may be assistance data associated with the at least one filter of the wireless device. The at least one filter may be one or more of: at least one moving target indicator (MTI) filter, at least one radio frequency (RF) filter, or at least one baseband filter. The network entity may be a server or a sensing server, and the wireless device may be a network node, a user equipment (UE), or a base station. The assistance data associated with the at least one filter of the wireless device may be transmitted periodically to the wireless device.

At 1142, wireless device 1102 may receive, from a network entity, an indication of clutter information from at least one sensing node or at least one sensor (e.g., indication 1144), where the clutter information is associated with one or more stationary or slow-moving reflections of one or more signals with respect to the at least one sensing node or the at least one sensor. The clutter information may include at least one of: a power spectral density (PSD) of clutter associated with the clutter information, a classification of the clutter associated with the clutter information, a time stamp of the at least one sensing node or the at least one sensor, or a location of the at least one sensing node or the at least one sensor. The indication of the clutter information may be assistance data associated with the at least one filter of the wireless device. The at least one filter may be one or more of: at least one moving target indicator (MTI) filter, at least one radio frequency (RF) filter, or at least one baseband filter. The network entity may be a server or a sensing server, and the wireless device may be a network node, a user equipment (UE), or a base station. The assistance data associated with the at least one filter of the wireless device may be transmitted periodically to the wireless device.

At 1150, wireless device 1102 may configure at least one filter in a set of filters at the wireless device based on the clutter information from the at least one sensing node or the at least one sensor.

At 1160, wireless device 1102 may perform a radio frequency (RF) sensing measurement for the at least one filter of the wireless device.

At 1170, wireless device 1102 may transmit, for the network entity, an indication of the RF sensing measurement for the at least one filter of the wireless device (e.g., indication 1174). The indication of the RF sensing measurement for the at least one filter may include at least one of: moving target indicator (MTI) filter information of the at least one filter, an MTI type of the at least one filter, or a frequency response of the at least one filter. The RF sensing measurement for the at least one filter may be associated with a Kalman filter, a machine learning (ML) procedure, or a neural network (NN) procedure.

At 1172, network entity 1104 may receive, from the wireless device, an indication of a radio frequency (RF) sensing measurement for the at least one filter of the wireless device (e.g., indication 1174). The indication of the RF sensing measurement for the at least one filter may include at least one of: moving target indicator (MTI) filter information of the at least one filter, an MTI type of the at least one filter, or a frequency response of the at least one filter. The RF sensing measurement for the at least one filter may be associated with a Kalman filter, a machine learning (ML) procedure, or a neural network (NN) procedure.

At 1180, network entity 1104 may schedule at least one pulse repetition frequency (PRF) for the one or more signals.

At 1190, network entity 1104 may transmit an indication of the at least one PRF for the one or more signals (e.g., indication 1194). The at least one PRF for the one or more signals may be greater than a maximum frequency of a power spectral density (PSD) of clutter associated with the clutter information, or the at least one PRF for the one or more signals may be greater than a maximum Doppler frequency associated with a use case of a radio frequency (RF) sensing measurement for the at least one filter. In some aspects, the at least one PRF may be at least two PRFs, and each of the at least two PRFs may be staggered. Each of the at least two PRFs may be associated with a corresponding reference signal (RS) resource set in a set of RS resource sets, and each RS resource set in the set of RS resources sets may be associated with a different periodicity. Also, each of the at least two PRFs may be associated with a corresponding aperiodic sensing RS in a set of aperiodic sensing RSs and a corresponding periodic sensing RS in a set of periodic sensing RSs. Further, each of the at least two PRFs may be associated with a corresponding first aperiodic sensing RS in a set of first aperiodic sensing RSs and a corresponding second aperiodic sensing RS in a set of second aperiodic sensing RSs.

At 1192, wireless device 1102 may receive, from the network entity, an indication of at least one pulse repetition frequency (PRF) for the one or more signals (e.g., indication 1194). The at least one PRF for the one or more signals may be greater than a maximum frequency of a power spectral density (PSD) of clutter associated with the clutter information, or the at least one PRF for the one or more signals may be greater than a maximum Doppler frequency associated with a use case of a radio frequency (RF) sensing measurement for the at least one filter. In some aspects, the at least one PRF may be at least two PRFs, and each of the at least two PRFs may be staggered. Each of the at least two PRFs may be associated with a corresponding reference signal (RS) resource set in a set of RS resource sets, and each RS resource set in the set of RS resources sets may be associated with a different periodicity. Also, each of the at least two PRFs may be associated with a corresponding aperiodic sensing RS in a set of aperiodic sensing RSs and a corresponding periodic sensing RS in a set of periodic sensing RSs. Further, each of the at least two PRFs may be associated with a corresponding first aperiodic sensing RS in a set of first aperiodic sensing RSs and a corresponding second aperiodic sensing RS in a set of second aperiodic sensing RSs.

Figure 12:
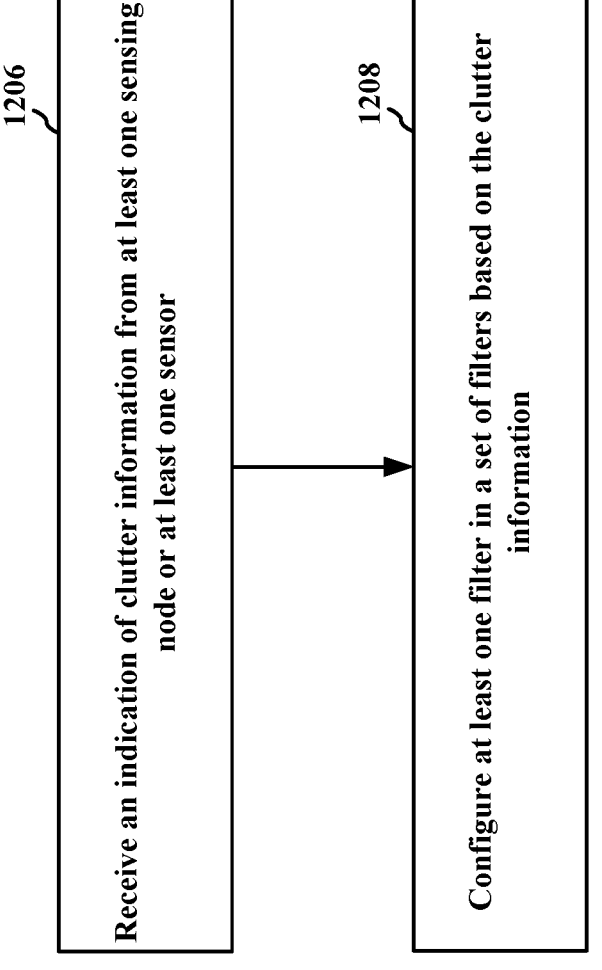
FIG. 12 is a flowchart of a method of wireless communication.

FIG. 12 is a flowchart 1200 of a method of wireless communication. The method may be performed by a wireless device, a UE, or a base station (e.g., base station 102, UE 104, wireless device 1102; the apparatus 1604; network entity 1702). The methods described herein may provide a number of benefits, such as improving resource utilization and/or power savings.

At 1206, the wireless device may receive, from a network entity, an indication of clutter information from at least one sensing node or at least one sensor, where the clutter information is associated with one or more stationary or slow-moving reflections of one or more signals with respect to the at least one sensing node or the at least one sensor, as discussed with respect to FIGS. 4-11. For example, as described in 1142 of FIG. 11, the wireless device 1102 may receive, from a network entity, an indication of clutter information from at least one sensing node or at least one sensor, where the clutter information is associated with one or more stationary or slow-moving reflections of one or more signals with respect to the at least one sensing node or the at least one sensor. Further, step 1206 may be performed by location component 198. The clutter information may include at least one of: a power spectral density (PSD) of clutter associated with the clutter information, a classification of the clutter associated with the clutter information, a time stamp of the at least one sensing node or the at least one sensor, or a location of the at least one sensing node or the at least one sensor. The indication of the clutter information may be assistance data associated with the at least one filter of the wireless device. The at least one filter may be one or more of: at least one moving target indicator (MTI) filter, at least one radio frequency (RF) filter, or at least one baseband filter. The network entity may be a server or a sensing server, and the wireless device may be a network node, a user equipment (UE), or a base station. The assistance data associated with the at least one filter of the wireless device may be transmitted periodically to the wireless device.

At 1208, the wireless device may configure at least one filter in a set of filters at the wireless device based on the clutter information from the at least one sensing node or the at least one sensor, as discussed with respect to FIGS. 4-11. For example, as described in 1150 of FIG. 11, the wireless device 1102 may configure at least one filter in a set of filters at the wireless device based on the clutter information from the at least one sensing node or the at least one sensor. Further, step 1208 may be performed by location component 198.

Figure 13:
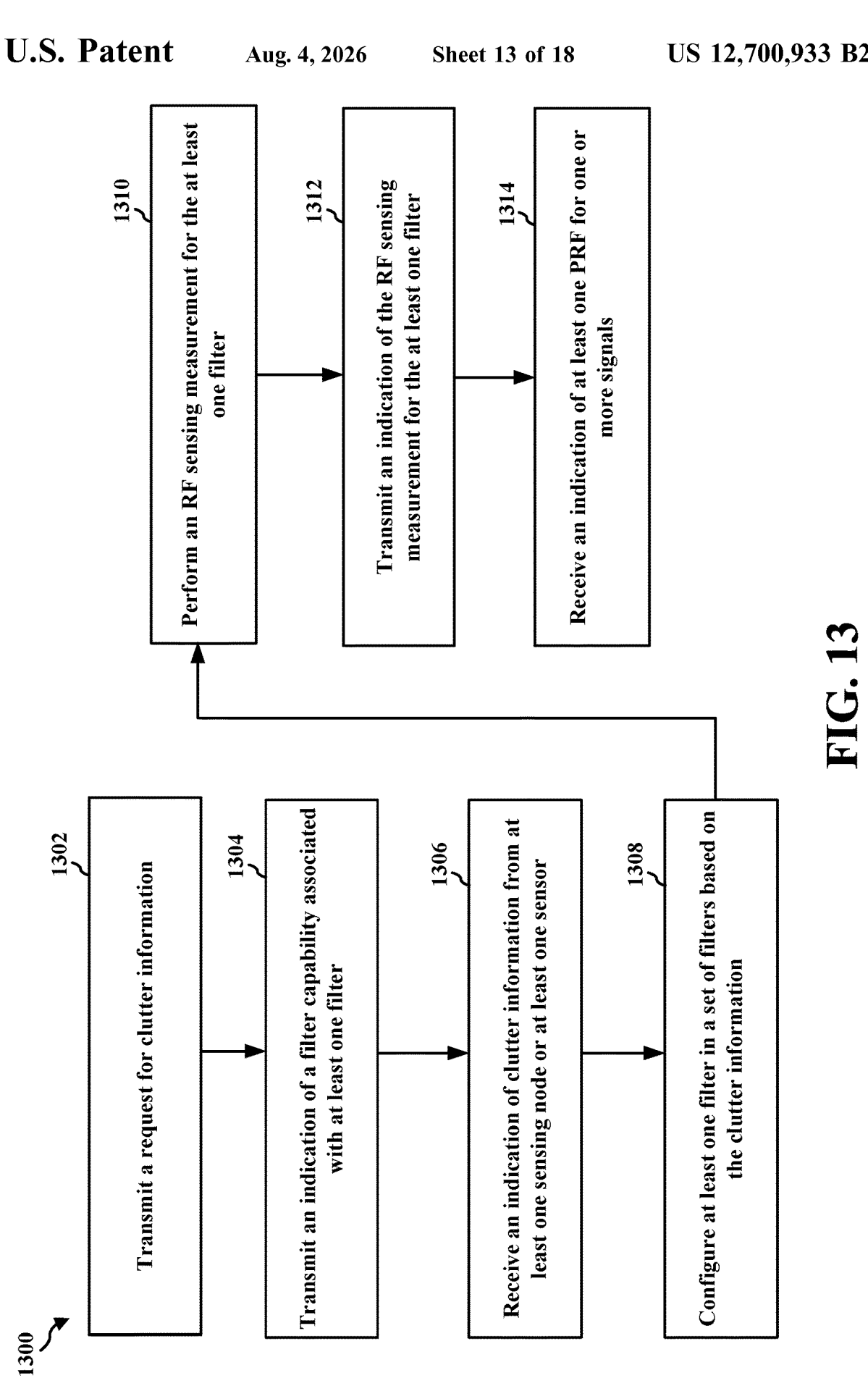
FIG. 13 is a flowchart of a method of wireless communication.

FIG. 13 is a flowchart 1300 of a method of wireless communication. The method may be performed by a wireless device, a UE, or a base station (e.g., base station 102, UE 104, wireless device 1102; the apparatus 1604; network entity 1702). The methods described herein may provide a number of benefits, such as improving resource utilization and/or power savings.

At 1302, the wireless device may transmit, for a network entity, a request for clutter information, where an indication of the clutter information may be received based on the request, as discussed with respect to FIGS. 4-11. For example, as described in 1110 of FIG. 11, the wireless device 1102 may transmit, for a network entity, a request for clutter information, where an indication of the clutter information may be received based on the request. Further, step 1302 may be performed by location component 198.

At 1304, the wireless device may transmit, for the network entity, an indication of a filter capability associated with at least one filter of the wireless device, as discussed with respect to FIGS. 4-11. For example, as described in 1120 of FIG. 11, the wireless device 1102 may transmit, for the network entity, an indication of a filter capability associated with at least one filter of the wireless device. Further, step 1304 may be performed by location component 198. The indication of the filter capability may include at least one type of the at least one filter, or the at least one filter may be at least one moving target indicator (MTI) filter and the indication of the filter capability may include at least one type of the at least one MTI filter.

At 1306, the wireless device may receive, from a network entity, an indication of clutter information from at least one sensing node or at least one sensor, where the clutter information is associated with one or more stationary or slow-moving reflections of one or more signals with respect to the at least one sensing node or the at least one sensor, as discussed with respect to FIGS. 4-11. For example, as described in 1142 of FIG. 11, the wireless device 1102 may receive, from a network entity, an indication of clutter information from at least one sensing node or at least one sensor, where the clutter information is associated with one or more stationary or slow-moving reflections of one or more signals with respect to the at least one sensing node or the at least one sensor. Further, step 1306 may be performed by location component 198. The clutter information may include at least one of: a power spectral density (PSD) of clutter associated with the clutter information, a classification of the clutter associated with the clutter information, a time stamp of the at least one sensing node or the at least one sensor, or a location of the at least one sensing node or the at least one sensor. The indication of the clutter information may be assistance data associated with the at least one filter of the wireless device. The at least one filter may be one or more of: at least one moving target indicator (MTI) filter, at least one radio frequency (RF) filter, or at least one baseband filter. The network entity may be a server or a sensing server, and the wireless device may be a network node, a user equipment (UE), or a base station. The assistance data associated with the at least one filter of the wireless device may be transmitted periodically to the wireless device.

At 1308, the wireless device may configure at least one filter in a set of filters at the wireless device based on the clutter information from the at least one sensing node or the at least one sensor, as discussed with respect to FIGS. 4-11. For example, as described in 1150 of FIG. 11, the wireless device 1102 may configure at least one filter in a set of filters at the wireless device based on the clutter information from the at least one sensing node or the at least one sensor. Further, step 1308 may be performed by location component 198.

At 1310, the wireless device may perform a radio frequency (RF) sensing measurement for the at least one filter of the wireless device, as discussed with respect to FIGS. 4-11. For example, as described in 1160 of FIG. 11, the wireless device 1102 may perform a radio frequency (RF) sensing measurement for the at least one filter of the wireless device. Further, step 1310 may be performed by location component 198.

At 1312, the wireless device may transmit, for the network entity, an indication of the RF sensing measurement for the at least one filter of the wireless device, as discussed with respect to FIGS. 4-11. For example, as described in 1170 of FIG. 11, the wireless device 1102 may transmit, for the network entity, an indication of the RF sensing measurement for the at least one filter of the wireless device. Further, step 1312 may be performed by location component 198. The indication of the RF sensing measurement for the at least one filter may include at least one of: moving target indicator (MTI) filter information of the at least one filter, an MTI type of the at least one filter, or a frequency response of the at least one filter. The RF sensing measurement for the at least one filter may be associated with a Kalman filter, a machine learning (ML) procedure, or a neural network (NN) procedure.

At 1314, the wireless device may receive, from the network entity, an indication of at least one pulse repetition frequency (PRF) for the one or more signals, as discussed with respect to FIGS. 4-11. For example, as described in 1192 of FIG. 11, the wireless device 1102 may receive, from the network entity, an indication of at least one pulse repetition frequency (PRF) for the one or more signals. Further, step 1314 may be performed by location component 198. The at least one PRF for the one or more signals may be greater than a maximum frequency of a power spectral density (PSD) of clutter associated with the clutter information, or the at least one PRF for the one or more signals may be greater than a maximum Doppler frequency associated with a use case of a radio frequency (RF) sensing measurement for the at least one filter. In some aspects, the at least one PRF may be at least two PRFs, and each of the at least two PRFs may be staggered. Each of the at least two PRFs may be associated with a corresponding reference signal (RS) resource set in a set of RS resource sets, and each RS resource set in the set of RS resources sets may be associated with a different periodicity. Also, each of the at least two PRFs may be associated with a corresponding aperiodic sensing RS in a set of aperiodic sensing RSs and a corresponding periodic sensing RS in a set of periodic sensing RSs. Further, each of the at least two PRFs may be associated with a corresponding first aperiodic sensing RS in a set of first aperiodic sensing RSs and a corresponding second aperiodic sensing RS in a set of second aperiodic sensing RSs.

FIG. 14 is a flowchart 1400 of a method of wireless communication. The method may be performed by a network entity, a server, or a sensing server (e.g., LMF 166; set of locations servers 168; network entity 1104; network entity 1860). The methods described herein may provide a number of benefits, such as improving resource utilization and/or power savings.

At 1406, the network entity may obtain clutter information from at least one sensing node or at least one sensor, where the clutter information is associated with one or more stationary or slow-moving reflections of one or more signals with respect to the at least one sensing node or the at least one sensor, as discussed with respect to FIGS. 4-11. For example, as described in 1130 of FIG. 11, network entity 1104 may obtain clutter information from at least one sensing node or at least one sensor, where the clutter information is associated with one or more stationary or slow-moving reflections of one or more signals with respect to the at least one sensing node or the at least one sensor. Further, step 1406 may be performed by location component 199. The clutter information may include at least one of: a power spectral density (PSD) of clutter associated with the clutter information, a classification of the clutter associated with the clutter information, a time stamp of the at least one sensing node or the at least one sensor, or a location of the at least one sensing node or the at least one sensor.

At 1408, the network entity may transmit, for a wireless device, an indication of the clutter information from the at least one sensing node or the at least one sensor, where the clutter information is associated with at least one filter of the wireless device, as discussed with respect to FIGS. 4-11. For example, as described in 1140 of FIG. 11, network entity 1104 may transmit, for a wireless device, an indication of the clutter information from the at least one sensing node or the at least one sensor, where the clutter information is associated with at least one filter of the wireless device. Further, step 1408 may be performed by location component 199. The indication of the clutter information may be assistance data associated with the at least one filter of the wireless device. The at least one filter may be one or more of: at least one moving target indicator (MTI) filter, at least one radio frequency (RF) filter, or at least one baseband filter. The network entity may be a server or a sensing server, and the wireless device may be a network node, a user equipment (UE), or a base station. The assistance data associated with the at least one filter of the wireless device may be transmitted periodically to the wireless device.

FIG. 15 is a flowchart 1500 of a method of wireless communication. The method may be performed by a network entity, a server, or a sensing server (e.g., LMF 166; set of locations servers 168; network entity 1104; network entity 1860). The methods described herein may provide a number of benefits, such as improving resource utilization and/or power savings.

At 1502, the network entity may receive, from a wireless device, a request for clutter information, where an indication of the clutter information may be transmitted based on the request, as discussed with respect to FIGS. 4-11. For example, as described in 1112 of FIG. 11, network entity 1104 may receive, from a wireless device, a request for clutter information, where an indication of the clutter information may be transmitted based on the request. Further, step 1502 may be performed by location component 199.

At 1504, the network entity may receive, from the wireless device, an indication of a filter capability associated with at least one filter of the wireless device, as discussed with respect to FIGS. 4-11. For example, as described in 1122 of FIG. 11, network entity 1104 may receive, from the wireless device, an indication of a filter capability associated with at least one filter of the wireless device. Further, step 1504 may be performed by location component 199. The indication of the filter capability may include at least one type of the at least one filter, or the at least one filter may be at least one moving target indicator (MTI) filter and the indication of the filter capability may include at least one type of the at least one MTI filter.

At 1506, the network entity may obtain clutter information from at least one sensing node or at least one sensor, where the clutter information is associated with one or more stationary or slow-moving reflections of one or more signals with respect to the at least one sensing node or the at least one sensor, as discussed with respect to FIGS. 4-11. For example, as described in 1130 of FIG. 11, network entity 1104 may obtain clutter information from at least one sensing node or at least one sensor, where the clutter information is associated with one or more stationary or slow-moving reflections of one or more signals with respect to the at least one sensing node or the at least one sensor. Further, step 1506 may be performed by location component 199. The clutter information may include at least one of: a power spectral density (PSD) of clutter associated with the clutter information, a classification of the clutter associated with the clutter information, a time stamp of the at least one sensing node or the at least one sensor, or a location of the at least one sensing node or the at least one sensor.

At 1508, the network entity may transmit, for a wireless device, an indication of the clutter information from the at least one sensing node or the at least one sensor, where the clutter information is associated with at least one filter of the wireless device, as discussed with respect to FIGS. 4-11. For example, as described in 1140 of FIG. 11, network entity 1104 may transmit, for a wireless device, an indication of the clutter information from the at least one sensing node or the at least one sensor, where the clutter information is associated with at least one filter of the wireless device. Further, step 1508 may be performed by location component 199. The indication of the clutter information may be assistance data associated with the at least one filter of the wireless device. The at least one filter may be one or more of: at least one moving target indicator (MTI) filter, at least one radio frequency (RF) filter, or at least one baseband filter. The network entity may be a server or a sensing server, and the wireless device may be a network node, a user equipment (UE), or a base station. The assistance data associated with the at least one filter of the wireless device may be transmitted periodically to the wireless device.

At 1510, the network entity may receive, from the wireless device, an indication of a radio frequency (RF) sensing measurement for the at least one filter of the wireless device, as discussed with respect to FIGS. 4-11. For example, as described in 1172 of FIG. 11, network entity 1104 may receive, from the wireless device, an indication of a radio frequency (RF) sensing measurement for the at least one filter of the wireless device. Further, step 1510 may be performed by location component 199. The indication of the RF sensing measurement for the at least one filter may include at least one of: moving target indicator (MTI) filter information of the at least one filter, an MTI type of the at least one filter, or a frequency response of the at least one filter. The RF sensing measurement for the at least one filter may be associated with a Kalman filter, a machine learning (ML) procedure, or a neural network (NN) procedure.

At 1512, the network entity may schedule at least one pulse repetition frequency (PRF) for the one or more signals, as discussed with respect to FIGS. 4-11. For example, as described in 1180 of FIG. 11, network entity 1104 may schedule at least one pulse repetition frequency (PRF) for the one or more signals. Further, step 1512 may be performed by location component 199.

At 1514, the network entity may transmit an indication of the at least one PRF for the one or more signals, as discussed with respect to FIGS. 4-11. For example, as described in 1190 of FIG. 11, network entity 1104 may transmit an indication of the at least one PRF for the one or more signals. Further, step 1514 may be performed by location component 199. The at least one PRF for the one or more signals may be greater than a maximum frequency of a power spectral density (PSD) of clutter associated with the clutter information, or the at least one PRF for the one or more signals may be greater than a maximum Doppler frequency associated with a use case of a radio frequency (RF) sensing measurement for the at least one filter. In some aspects, the at least one PRF may be at least two PRFs, and each of the at least two PRFs may be staggered. Each of the at least two PRFs may be associated with a corresponding reference signal (RS) resource set in a set of RS resource sets, and each RS resource set in the set of RS resources sets may be associated with a different periodicity. Also, each of the at least two PRFs may be associated with a corresponding aperiodic sensing RS in a set of aperiodic sensing RSs and a corresponding periodic sensing RS in a set of periodic sensing RSs. Further, each of the at least two PRFs may be associated with a corresponding first aperiodic sensing RS in a set of first aperiodic sensing RSs and a corresponding second aperiodic sensing RS in a set of second aperiodic sensing RSs.

Figure 16:
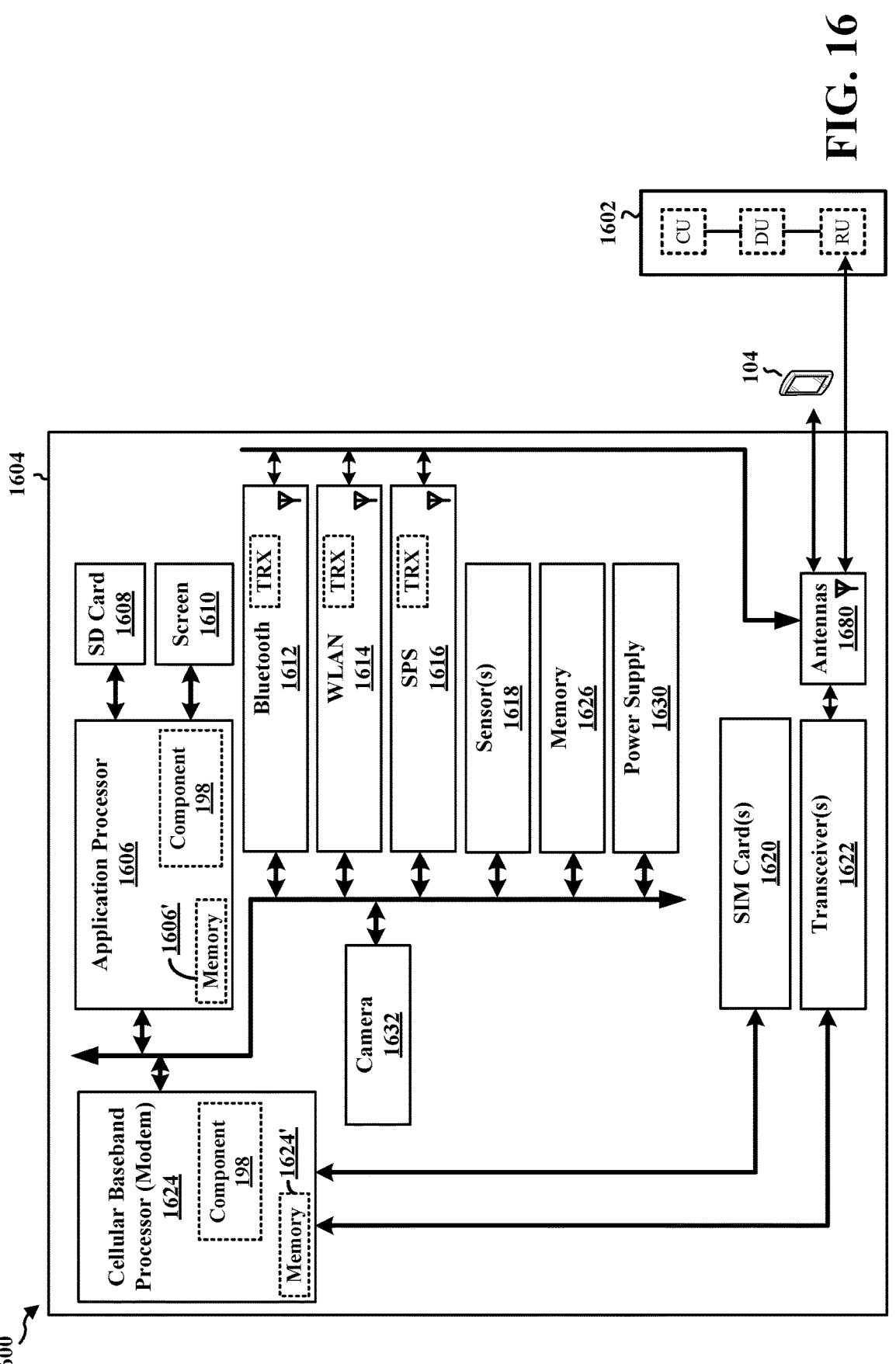
FIG. 16 is a diagram illustrating an example of a hardware implementation for an example apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include a cellular baseband processor 1624 (also referred to as a modem) coupled to one or more transceivers 1622 (e.g., cellular RF transceiver). The cellular baseband processor 1624 may include on-chip memory 1624'. In some aspects, the apparatus 1604 may further include one or more subscriber identity modules (SIM) cards 1620 and an application processor 1606 coupled to a secure digital (SD) card 1608 and a screen 1610. The application processor 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor 1624 communicates through the transceiver(s) 1622 via one or more antennas 1680 with the UE 104 and/or with an RU associated with a network entity 1602. The cellular baseband processor 1624 and the application processor 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the TX processor 368, the RX processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see 350 of FIG. 3) and include the additional modules of the apparatus 1604.

As discussed supra, the location component 198 may be configured to receive, from a network entity, an indication of clutter information from at least one sensing node or at least one sensor, where the clutter information is associated with one or more stationary or slow-moving reflections of one or more signals with respect to the at least one sensing node or the at least one sensor. The location component 198 may also be configured to configure at least one filter in a set of filters at the wireless device based on the clutter information from the at least one sensing node or the at least one sensor. The location component 198 may also be configured to transmit, for the network entity, a request for the clutter information, where the indication of the clutter information is received based on the request. The location component 198 may also be configured to perform a radio frequency (RF) sensing measurement for the at least one filter of the wireless device. The location component 198 may also be configured to transmit, for the network entity, an indication of the RF sensing measurement for the at least one filter of the wireless device. The location component 198 may also be configured to transmit, for the network entity, an indication of a filter capability associated with the at least one filter of the wireless device. The location component 198 may also be configured to receive, from the network entity, an indication of at least one pulse repetition frequency (PRF) for the one or more signals.

The location component 198 may be within the cellular baseband processor 1624, the application processor 1606, or both the cellular baseband processor 1624 and the application processor 1606. The location component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, includes means for receiving, from a network entity, an indication of clutter information from at least one sensing node or at least one sensor, where the clutter information is associated with one or more stationary or slow-moving reflections of one or more signals with respect to the at least one sensing node or the at least one sensor. The apparatus 1604 may also include means for configuring at least one filter in a set of filters at the wireless device based on the clutter information from the at least one sensing node or the at least one sensor. The apparatus 1604 may also include means for transmitting, for the network entity, a request for the clutter information, where the indication of the clutter information is received based on the request. The apparatus 1604 may also include means for performing a radio frequency (RF) sensing measurement for the at least one filter of the wireless device. The apparatus 1604 may also include means for transmitting, for the network entity, an indication of the RF sensing measurement for the at least one filter of the wireless device. The apparatus 1604 may also include means for transmitting, for the network entity, an indication of a filter capability associated with the at least one filter of the wireless device. The apparatus 1604 may also include means for receiving, from the network entity, an indication of at least one pulse repetition frequency (PRF) for the one or more signals. The means may be the location component 198 of the apparatus 1604 configured to perform the functions recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

Figure 17:
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the location component 198, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the location component 198 may be configured to receive, from a network entity, an indication of clutter information from at least one sensing node or at least one sensor, where the clutter information is associated with one or more stationary or slow-moving reflections of one or more signals with respect to the at least one sensing node or the at least one sensor. The location component 198 may also be configured to configure at least one filter in a set of filters at the wireless device based on the clutter information from the at least one sensing node or the at least one sensor. The location component 198 may also be configured to transmit, for the network entity, a request for the clutter information, where the indication of the clutter information is received based on the request. The location component 198 may also be configured to perform a radio frequency (RF) sensing measurement for the at least one filter of the wireless device. The location component 198 may also be configured to transmit, for the network entity, an indication of the RF sensing measurement for the at least one filter of the wireless device. The location component 198 may also be configured to transmit, for the network entity, an indication of a filter capability associated with the at least one filter of the wireless device. The location component 198 may also be configured to receive, from the network entity, an indication of at least one pulse repetition frequency (PRF) for the one or more signals.

The location component 198 may be within one or more processors of one or more of the CU 1710, DU 1730, and the RU 1740. The location component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for receiving, from a network entity, an indication of clutter information from at least one sensing node or at least one sensor, where the clutter information is associated with one or more stationary or slow-moving reflections of one or more signals with respect to the at least one sensing node or the at least one sensor. The network entity 1702 may also include means for configuring at least one filter in a set of filters at the wireless device based on the clutter information from the at least one sensing node or the at least one sensor. The network entity 1702 may also include means for transmitting, for the network entity, a request for the clutter information, where the indication of the clutter information is received based on the request. The network entity 1702 may also include means for performing a radio frequency (RF) sensing measurement for the at least one filter of the wireless device. The network entity 1702 may also include means for transmitting, for the network entity, an indication of the RF sensing measurement for the at least one filter of the wireless device. The network entity 1702 may also include means for transmitting, for the network entity, an indication of a filter capability associated with the at least one filter of the wireless device. The network entity 1702 may also include means for receiving, from the network entity, an indication of at least one pulse repetition frequency (PRF) for the one or more signals. The means may be the location component 198 of the network entity 1702 configured to perform the functions recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

FIG. 18 is a diagram 1800 illustrating an example of a hardware implementation for a network entity 1860. In one example, the network entity 1860 may be within the core network 120. The network entity 1860 may include a network processor 1812. The network processor 1812 may include on-chip memory 1812'. In some aspects, the network entity 1860 may further include additional memory modules 1814. The network entity 1860 communicates via the network interface 1880 directly (e.g., backhaul link) or indirectly (e.g., through a RIC) with the CU 1802. The on-chip memory 1812' and the additional memory modules 1814 may each be considered a computer-readable medium/memory. Each computer-readable medium/memory may be non-transitory. The processor 1812 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the location component 199 may be configured to obtain clutter information from at least one sensing node or at least one sensor, where the clutter information is associated with one or more stationary or slow-moving reflections of one or more signals with respect to the at least one sensing node or the at least one sensor. The location component 199 may also be configured to transmit, for a wireless device, an indication of the clutter information from the at least one sensing node or the at least one sensor, where the clutter information is associated with at least one filter of the wireless device. The location component 199 may also be configured to receive, from the wireless device, a request for the clutter information, where the indication of the clutter information is transmitted based on the request. The location component 199 may also be configured to receive, from the wireless device, an indication of a radio frequency (RF) sensing measurement for the at least one filter of the wireless device. The location component 199 may also be configured to receive, from the wireless device, an indication of a filter capability associated with the at least one filter of the wireless device. The location component 199 may also be configured to schedule at least one pulse repetition frequency (PRF) for the one or more signals. The location component 199 may also be configured to transmit an indication of the at least one PRF for the one or more signals.

The location component 199 may be within the processor 1812. The location component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1860 may include a variety of components configured for various functions. In one configuration, the network entity 1860 may include means for obtaining clutter information from at least one sensing node or at least one sensor, where the clutter information is associated with one or more stationary or slow-moving reflections of one or more signals with respect to the at least one sensing node or the at least one sensor. The network entity 1860 may also include means for transmitting, for a wireless device, an indication of the clutter information from the at least one sensing node or the at least one sensor, where the clutter information is associated with at least one filter of the wireless device. The network entity 1860 may also include means for receiving, from the wireless device, a request for the clutter information, where the indication of the clutter information is transmitted based on the request. The network entity 1860 may also include means for receiving, from the wireless device, an indication of a radio frequency (RF) sensing measurement for the at least one filter of the wireless device. The network entity 1860 may also include means for receiving, from the wireless device, an indication of a filter capability associated with the at least one filter of the wireless device. The network entity 1860 may also include means for scheduling at least one pulse repetition frequency (PRF) for the one or more signals. The network entity 1860 may also include means for transmitting an indication of the at least one PRF for the one or more signals. The means may be the location component 199 of the network entity 1860 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an apparatus for wireless communication at a network entity, including a memory and at least one processor coupled to the memory and, based at least in part on information stored in the memory, the at least one processor is configured to: receive, from a network entity, an indication of clutter information from at least one sensing node or at least one sensor, where the clutter information is associated with one or more stationary or slow-moving reflections of one or more signals with respect to the at least one sensing node or the at least one sensor; and configure at least one filter in a set of filters at the wireless device based on the clutter information from the at least one sensing node or the at least one sensor.

Aspect 2 is the apparatus of aspect 1, where the clutter information includes at least one of: a power spectral density (PSD) of clutter associated with the clutter information, a classification of the clutter associated with the clutter information, a time stamp of the at least one sensing node or the at least one sensor, or a location of the at least one sensing node or the at least one sensor.

Aspect 3 is the apparatus of any of aspects 1 and 2, where the indication of the clutter information is assistance data associated with the at least one filter of the wireless device.

Aspect 4 is the apparatus of aspect 3, where the at least one filter is one or more of: at least one moving target indicator (MTI) filter, at least one radio frequency (RF) filter, or at least one baseband filter, where the network entity is a server or a sensing server, where the wireless device is a network node, a user equipment (UE), or a base station.

Aspect 5 is the apparatus of aspect 3, where the assistance data associated with the at least one filter of the wireless device is configured to be transmitted periodically to the wireless device.

Aspect 6 is the apparatus of any of aspects 1 to 5, where the at least one processor is further configured to: transmit, for the network entity, a request for the clutter information, and where to receive the indication of the clutter information, the at least one processor is configured to receive the indication of the clutter information based on the request.

Aspect 7 is the apparatus of any of aspects 1 to 6, where the at least one processor is further configured to: perform a radio frequency (RF) sensing measurement for the at least one filter of the wireless device; and transmit, for the network entity, an indication of the RF sensing measurement for the at least one filter of the wireless device.

Aspect 8 is the apparatus of aspect 7, where the indication of the RF sensing measurement for the at least one filter includes at least one of: moving target indicator (MTI) filter information of the at least one filter, an MTI type of the at least one filter, or a frequency response of the at least one filter.

Aspect 9 is the apparatus of aspect 7, where the RF sensing measurement for the at least one filter is associated with a Kalman filter, a machine learning (ML) procedure, or a neural network (NN) procedure.

Aspect 10 is the apparatus of any of aspects 1 to 9, where the at least one processor is further configured to: transmit, for the network entity, an indication of a filter capability associated with the at least one filter of the wireless device.

Aspect 11 is the apparatus of aspect 10, where the indication of the filter capability includes at least one type of the at least one filter, or where the at least one filter is at least one moving target indicator (MTI) filter and the indication of the filter capability includes at least one type of the at least one MTI filter.

Aspect 12 is the apparatus of any of aspects 1 to 11, where the at least one processor is further configured to: receive, from the network entity, an indication of at least one pulse repetition frequency (PRF) for the one or more signals.

Aspect 13 is the apparatus of aspect 12, where the at least one PRF for the one or more signals is greater than a maximum frequency of a power spectral density (PSD) of clutter associated with the clutter information, or where the at least one PRF for the one or more signals is greater than a maximum Doppler frequency associated with a use case of a radio frequency (RF) sensing measurement for the at least one filter.

Aspect 14 is the apparatus of aspect 12, where the at least one PRF is at least two PRFs, and where each of the at least two PRFs is staggered.

Aspect 15 is the apparatus of aspect 14, where each of the at least two PRFs is associated with a corresponding reference signal (RS) resource set in a set of RS resource sets, and where each RS resource set in the set of RS resources sets is associated with a different periodicity.

Aspect 16 is the apparatus of aspect 14, where each of the at least two PRFs is associated with a corresponding aperiodic sensing RS in a set of aperiodic sensing RSs and a corresponding periodic sensing RS in a set of periodic sensing RSs.

Aspect 17 is the apparatus of aspect 14, where each of the at least two PRFs is associated with a corresponding first aperiodic sensing RS in a set of first aperiodic sensing RSs and a corresponding second aperiodic sensing RS in a set of second aperiodic sensing RSs.

Aspect 18 is an apparatus for wireless communication at a network entity, including a memory and at least one processor coupled to the memory and, based at least in part on information stored in the memory, the at least one processor is configured to: obtain clutter information from at least one sensing node or at least one sensor, where the clutter information is associated with one or more stationary or slow-moving reflections of one or more signals with respect to the at least one sensing node or the at least one sensor; and transmit, for a wireless device, an indication of the clutter information from the at least one sensing node or the at least one sensor, where the clutter information is associated with at least one filter of the wireless device.

Aspect 19 is the apparatus of aspect 18, where the clutter information includes at least one of: a power spectral density (PSD) of clutter associated with the clutter information, a classification of the clutter associated with the clutter information, a time stamp of the at least one sensing node or the at least one sensor, or a location of the at least one sensing node or the at least one sensor.

Aspect 20 is the apparatus of any of aspects 18 and 19, where the indication of the clutter information is assistance data associated with the at least one filter of the wireless device, where the at least one filter is one or more of: at least one moving target indicator (MTI) filter, at least one radio frequency (RF) filter, or at least one baseband filter, where the network entity is a server or a sensing server, where the wireless device is a network node, a user equipment (UE), or a base station, and where the assistance data associated with the at least one filter of the wireless device is configured to be transmitted periodically to the wireless device.

Aspect 21 is the apparatus of any of aspects 18 to 20, where the at least one processor is further configured to: receive, from the wireless device, a request for the clutter information, and where to transmit the indication of the clutter information, the at least one processor is configured to transmit the indication of the clutter information based on the request.

Aspect 22 is the apparatus of any of aspects 18 to 21, where the at least one processor is further configured to: receive, from the wireless device, an indication of a radio frequency (RF) sensing measurement for the at least one filter of the wireless device.

Aspect 23 is the apparatus of aspect 22, where the indication of the RF sensing measurement for the at least one filter includes at least one of: moving target indicator (MTI) filter information of the at least one filter, an MTI type of the at least one filter, or a frequency response of the at least one filter, where the RF sensing measurement for the at least one filter is associated with a Kalman filter, a machine learning (ML) procedure, or a neural network (NN) procedure.

Aspect 24 is the apparatus of any of aspects 18 to 23, where the at least one processor is further configured to: receive, from the wireless device, an indication of a filter capability associated with the at least one filter of the wireless device, where the indication of the filter capability includes at least one type of the at least one filter, or where the at least one filter is at least one moving target indicator (MTI) filter and the indication of the filter capability includes at least one type of the at least one MTI filter.

Aspect 25 is the apparatus of any of aspects 18 to 24, where the at least one processor is further configured to: schedule at least one pulse repetition frequency (PRF) for the one or more signals; and transmit an indication of the at least one PRF for the one or more signals.

Aspect 26 is the apparatus of aspect 25, where the at least one PRF for the one or more signals is greater than a maximum frequency of a power spectral density (PSD) of clutter associated with the clutter information, or where the at least one PRF for the one or more signals is greater than a maximum Doppler frequency associated with a use case of a radio frequency (RF) sensing measurement for the at least one filter.

Aspect 27 is the apparatus of aspect 25, where the at least one PRF is at least two PRFs, and where each of the at least two PRFs is staggered.

Aspect 28 is the apparatus of aspect 27, where each of the at least two PRFs is associated with a corresponding reference signal (RS) resource set in a set of RS resource sets, and where each RS resource set in the set of RS resources sets is associated with a different periodicity; where each of the at least two PRFs is associated with a corresponding aperiodic sensing reference signal (RS) in a set of aperiodic sensing RSs and a corresponding periodic sensing RS in a set of periodic sensing RSs; or where each of the at least two PRFs is associated with a corresponding first aperiodic sensing reference signal (RS) in a set of first aperiodic sensing RSs and a corresponding second aperiodic sensing RS in a set of second aperiodic sensing RSs.

Aspect 29 is the apparatus of any of aspects 1 to 28, where the apparatus is a wireless communication device, further including at least one of an antenna or a transceiver coupled to the at least one processor.

Aspect 30 is a method of wireless communication for implementing any of aspects 1 to 29.

Aspect 31 is an apparatus for wireless communication including means for implementing any of aspects 1 to 29.

Aspect 32 is a computer-readable medium (e.g., a non-transitory computer-readable medium) storing computer executable code, the code when executed by at least one processor causes the at least one processor to implement any of aspects 1 to 29.

What is claimed is:

1. An apparatus for wireless communication at a wireless device, comprising:
   memory; and
   at least one processor coupled to the memory and, based at least in part on information stored in the memory, the at least one processor is configured to:
   receive, from a network entity, an indication of clutter information from at least one sensing node or at least one sensor, wherein the clutter information is associated with one or more stationary or slow-moving reflections of one or more signals with respect to the at least one sensing node or the at least one sensor;
   configure at least one filter in a set of filters at the wireless device based on the received clutter information from the at least one sensing node or the at least one sensor, wherein the indication of the clutter information comprises assistance data associated with the at least one filter of the wireless device;
   perform a radio frequency (RF) sensing measurement for the configured at least one filter of the wireless device; and
   transmit, for the network entity, an indication of the RF sensing measurement for the configured at least one filter of the wireless device.

2. The apparatus of claim 1, wherein the clutter information includes at least one of:
   a power spectral density (PSD) of clutter associated with the clutter information;
   a classification of the clutter associated with the clutter information;
   a time stamp of the at least one sensing node or the at least one sensor; or
   a location of the at least one sensing node or the at least one sensor.

3. The apparatus of claim 1, wherein the at least one filter comprises one or more of:
   at least one moving target indicator (MTI) filter;
   at least one radio frequency (RF) filter; or
   at least one baseband filter, wherein the network entity comprises a server or a sensing server, wherein the wireless device comprises a network node, a user equipment (UE), or a base station.

4. The apparatus of claim 1, wherein, to receive the indication of clutter information, the at least one processor is configured to:
   periodically receive the indication of clutter information comprising the assistance data associated with the at least one filter of the wireless device.

5. The apparatus of claim 1, wherein the at least one processor is further configured to:
   transmit, for the network entity, a request for the clutter information, wherein, to receive the indication of the clutter information, the at least one processor is configured to:
   receive the indication of the clutter information based on the transmitted request.

6. The apparatus of claim 1, wherein the indication of the RF sensing measurement for the configured at least one filter includes at least one of:
   moving target indicator (MTI) filter information of the configured at least one filter;
   an MTI type of the configured at least one filter; or
   a frequency response of the configured at least one filter.

7. The apparatus of claim 1, wherein the RF sensing measurement for the at least one filter is associated with at least one of:
   a Kalman filter;
   a machine learning (ML) procedure; or
   a neural network (NN) procedure.

8. The apparatus of claim 1, wherein the at least one processor is further configured to:
   transmit, for the network entity, an indication of a filter capability associated with the at least one filter of the wireless device, wherein the indication of clutter information comprising assistance data associated with the at least one filter of the wireless device is based on the transmitted indication of the filter capability associated with the at least one filter of the wireless device.

9. The apparatus of claim 8, wherein the indication of the filter capability includes at least one type of the at least one filter, or wherein the at least one filter is at least one moving target indicator (MTI) filter and the indication of the filter capability includes at least one type of the at least one MTI filter.

10. The apparatus of claim 1, wherein the at least one processor is further configured to:
    receive, from the network entity, an indication of at least one pulse repetition frequency (PRF) for the one or more signals, wherein, to configure the at least one filter in the set of filters at the wireless device based on the clutter information from the at least one sensing node or the at least one sensor, the at least one processor is configured to:
    configure the at least one filter in the set of filters at the wireless device further based on the received indication of the at least one PRF for the one or more signals.

11. The apparatus of claim 10, wherein the at least one PRF for the one or more signals is greater than a maximum frequency of a power spectral density (PSD) of clutter associated with the clutter information, or wherein the at least one PRF for the one or more signals is greater than a maximum Doppler frequency associated with a use case of the RF sensing measurement for the at least one filter.

12. The apparatus of claim 10, wherein the at least one PRF comprises a plurality of PRFs, and wherein each PRF of the plurality of PRFs is staggered.

13. The apparatus of claim 12, wherein each PRF of the plurality of PRFs is associated with a corresponding reference signal (RS) resource set in a set of RS resource sets, and wherein each RS resource set in the set of RS resources sets is associated with a different periodicity.

14. The apparatus of claim 12, wherein each PRF of the plurality of PRFs is associated with a corresponding aperiodic sensing reference signal (RS) in a set of aperiodic sensing RSs and a corresponding periodic sensing RS in a set of periodic sensing RSs.

15. The apparatus of claim 12, further comprising at least one of an antenna or a transceiver coupled to the at least one processor, wherein, to receive the indication of the clutter information, the at least one processor is configured to:

receive the indication of the clutter information via at least one of the antenna or the transceiver, wherein each PRF of the plurality of PRFs is associated with a corresponding first aperiodic sensing reference signal (RS) in a set of first aperiodic sensing RSs and a corresponding second aperiodic sensing RS in a set of second aperiodic sensing RSs.

16. An apparatus for wireless communication at a network entity, comprising:

memory; and at least one processor coupled to the memory and, based at least in part on information stored in the memory, the at least one processor is configured to:

obtain clutter information from at least one sensing node or at least one sensor, wherein the clutter information is associated with one or more stationary or slow-moving reflections of one or more signals with respect to the at least one sensing node or the at least one sensor;

transmit, for a wireless device, an indication of the obtained clutter information from the at least one sensing node or the at least one sensor, wherein the indication of the clutter information comprises assistance data associated with at least one filter of the wireless device; and receive, from the wireless device, an indication of a radio frequency (RF) sensing measurement for the at least one filter of the wireless device based on the transmitted indication of the obtained clutter information.

17. The apparatus of claim 16, wherein the clutter information includes at least one of:

a power spectral density (PSD) of clutter associated with the clutter information;

a classification of the clutter associated with the clutter information;

a time stamp of the at least one sensing node or the at least one sensor; or a location of the at least one sensing node or the at least one sensor.

18. The apparatus of claim 16, wherein the at least one filter comprises one or more of:

at least one moving target indicator (MTI) filter;

at least one radio frequency (RF) filter; or at least one baseband filter, wherein the network entity comprises a server or a sensing server, wherein the wireless device comprises a network node, a user equipment (UE), or a base station, and wherein, to transmit the indication of the obtained clutter information, the at least one processor is configured to:

periodically transmit the indication of the obtained clutter information comprising the assistance data associated with the at least one filter of the wireless device.

19. The apparatus of claim 16, wherein the at least one processor is further configured to:

receive, from the wireless device, a request for the clutter information, wherein, to transmit the indication of the obtained clutter information, the at least one processor is configured to:

transmit the indication of the obtained clutter information based on the received request.

20. The apparatus of claim 16, wherein the indication of the RF sensing measurement for the at least one filter includes at least one of:

moving target indicator (MTI) filter information of the at least one filter;

an MTI type of the at least one filter; or a frequency response of the at least one filter, wherein the RF sensing measurement for the at least one filter is associated with at least one of:

a Kalman filter;

a machine learning (ML) procedure; or a neural network (NN) procedure.

21. The apparatus of claim 16, wherein the at least one processor is further configured to:

receive, from the wireless device, an indication of a filter capability associated with the at least one filter of the wireless device, wherein the indication of the filter capability includes at least one type of the at least one filter, or wherein the at least one filter is at least one moving target indicator (MTI) filter and the indication of the filter capability includes at least one type of the at least one MTI filter.

22. The apparatus of claim 16, wherein the at least one processor is further configured to:

schedule at least one pulse repetition frequency (PRF) for the one or more signals; and transmit an indication of the at least one PRF for the one or more signals.

23. The apparatus of claim 22, further comprising at least one of an antenna or a transceiver coupled to the at least one processor, wherein to transmit the indication of the clutter information, the at least one processor is configured to:

transmit the indication of the clutter information via at least one of the antenna or the transceiver, wherein the at least one PRF for the one or more signals is greater than a maximum frequency of a power spectral density (PSD) of clutter associated with the clutter information, or wherein the at least one PRF for the one or more signals is greater than a maximum Doppler frequency associated with a use case of the RF sensing measurement for the at least one filter.

24. The apparatus of claim 22, wherein the at least one PRF comprises a plurality of PRFs, and wherein each PRF of the plurality of PRFs is staggered.

25. The apparatus of claim 24, wherein each PRF of the plurality of PRFs is associated with a corresponding reference signal (RS) resource set in a set of RS resource sets, and wherein each RS resource set in the set of RS resources sets is associated with a different periodicity;

wherein each PRF of the plurality of PRFs is associated with a corresponding aperiodic sensing RS in a set of aperiodic sensing RSs and a corresponding periodic sensing RS in a set of periodic sensing RSs; or wherein each PRF of the plurality of PRFs is associated with a corresponding first aperiodic sensing RS in a set of first aperiodic sensing RSs and a corresponding second aperiodic sensing RS in a set of second aperiodic sensing RSs.

26. A method of wireless communication at a wireless device, comprising:

receiving, from a network entity, an indication of clutter information from at least one sensing node or at least one sensor, wherein the clutter information is associated with one or more stationary or slow-moving reflections of one or more signals with respect to the at least one sensing node or the at least one sensor;

configuring at least one filter in a set of filters at the wireless device based on the received clutter information from the at least one sensing node or the at least one sensor, wherein the indication of the clutter information comprises assistance data associated with the at least one filter of the wireless device;

performing a radio frequency (RF) sensing measurement for the configured at least one filter of the wireless device; and transmitting, for the network entity, an indication of the RF sensing measurement for the configured at least one filter of the wireless device.

27. A method of wireless communication at a network entity, comprising:

obtaining clutter information from at least one sensing node or at least one sensor, wherein the clutter information is associated with one or more stationary or slow-moving reflections of one or more signals with respect to the at least one sensing node or the at least one sensor;

transmitting, for a wireless device, an indication of the obtained clutter information from the at least one sensing node or the at least one sensor, wherein the indication of the clutter information comprises assistance data associated with at least one filter of the wireless device; and receiving, from the wireless device, an indication of a radio frequency (RF) sensing measurement for the at least one filter of the wireless device based on the transmitted indication of the obtained clutter information.

\* \* \* \* \*